(12) United States Patent
Fukuda

(10) Patent No.: US 8,413,207 B2
(45) Date of Patent: Apr. 2, 2013

(54) REMOTE CONTROL TERMINAL, INFORMATION ACQUIRING APPARATUS, INFORMATION PROVIDING APPARATUS, INFORMATION PROVIDING SYSTEM, INFORMATION PROVIDING METHOD, AND PROGRAM

(75) Inventor: Kazuhiro Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 928 days.

(21) Appl. No.: 12/266,638

(22) Filed: Nov. 7, 2008

(65) Prior Publication Data

US 2009/0125946 A1 May 14, 2009

(30) Foreign Application Priority Data

Nov. 8, 2007 (JP) ............................... P2007-291178

(51) Int. Cl.
*H04N 7/16* (2011.01)
*H04N 7/173* (2011.01)
(52) U.S. Cl. ......... 725/141; 725/133; 725/153; 348/734
(58) Field of Classification Search .................. 348/734; 725/133, 141, 151
See application file for complete search history.

(56) References Cited

U.S. PATENT DOCUMENTS

| 5,508,731 | A | * | 4/1996 | Kohorn | ........................... | 725/24 |
| 5,801,747 | A | * | 9/1998 | Bedard | ........................... | 725/46 |
| 6,567,984 | B1 | * | 5/2003 | Allport | ........................... | 725/110 |
| 7,237,253 | B1 | * | 6/2007 | Blackketter et al. | ............ | 725/61 |
| 7,818,762 | B2 | * | 10/2010 | Liu et al. | ........................... | 725/24 |
| 7,886,329 | B2 | * | 2/2011 | Koplar | ........................... | 725/133 |

| 2002/0059597 | A1 | | 5/2002 | Kikinis et al. | | |
| 2002/0133827 | A1 | * | 9/2002 | Newnam et al. | ................ | 725/89 |
| 2005/0060232 | A1 | | 3/2005 | Maggio | | |
| 2005/0251821 | A1 | | 11/2005 | Pina | | |
| 2005/0289596 | A1 | | 12/2005 | Ku et al. | | |
| 2006/0064734 | A1 | | 3/2006 | Ma | | |

FOREIGN PATENT DOCUMENTS

| EP | 1 503 584 | 2/2005 |
| JP | 6 303452 | 10/1994 |
| JP | 8 46888 | 2/1996 |
| JP | 8 307728 | 11/1996 |
| JP | 11 41566 | 2/1999 |
| JP | 11 225299 | 8/1999 |
| JP | 11 243512 | 9/1999 |
| JP | 2000 201344 | 7/2000 |
| JP | 2001 258011 | 9/2001 |

(Continued)

*Primary Examiner* — Hunter B Lonsberry
(74) *Attorney, Agent, or Firm* — Frommer Lawrence & Haug LLP; William S. Frommer; Paul A. Levy

(57) ABSTRACT

A commander includes a program identification information acquiring unit which acquires program identification information to designate a program to be watched by a receiving terminal, a channel selection control unit which remote-controls a channel selecting process by the receiving terminal based on program identification information, a scenario information acquiring unit which acquires scenario information included in electronic content guide information related to the program from an ECG server based on the program identification information, a display unit which displays the scenario information related to the program, and a display control unit which can control a display of the scenario information to change a display state of the scenario information related to the program depending on a display state of the scenario information on the receiving terminal based on predetermined setting information or predetermined operation information. Therefore, efficient use and effective provision of program meta information can be obtained.

16 Claims, 16 Drawing Sheets

FOREIGN PATENT DOCUMENTS

| | | |
|---|---|---|
| JP | 2002 15151 | 1/2002 |
| JP | 2003 125230 | 4/2003 |
| JP | 2003 174598 | 6/2003 |
| JP | 2003 333563 | 11/2003 |
| JP | 2005 45605 | 2/2005 |
| JP | 2005 151195 | 6/2005 |
| JP | 2005 533430 | 11/2005 |
| WO | WO 03 088027 | 10/2003 |

* cited by examiner

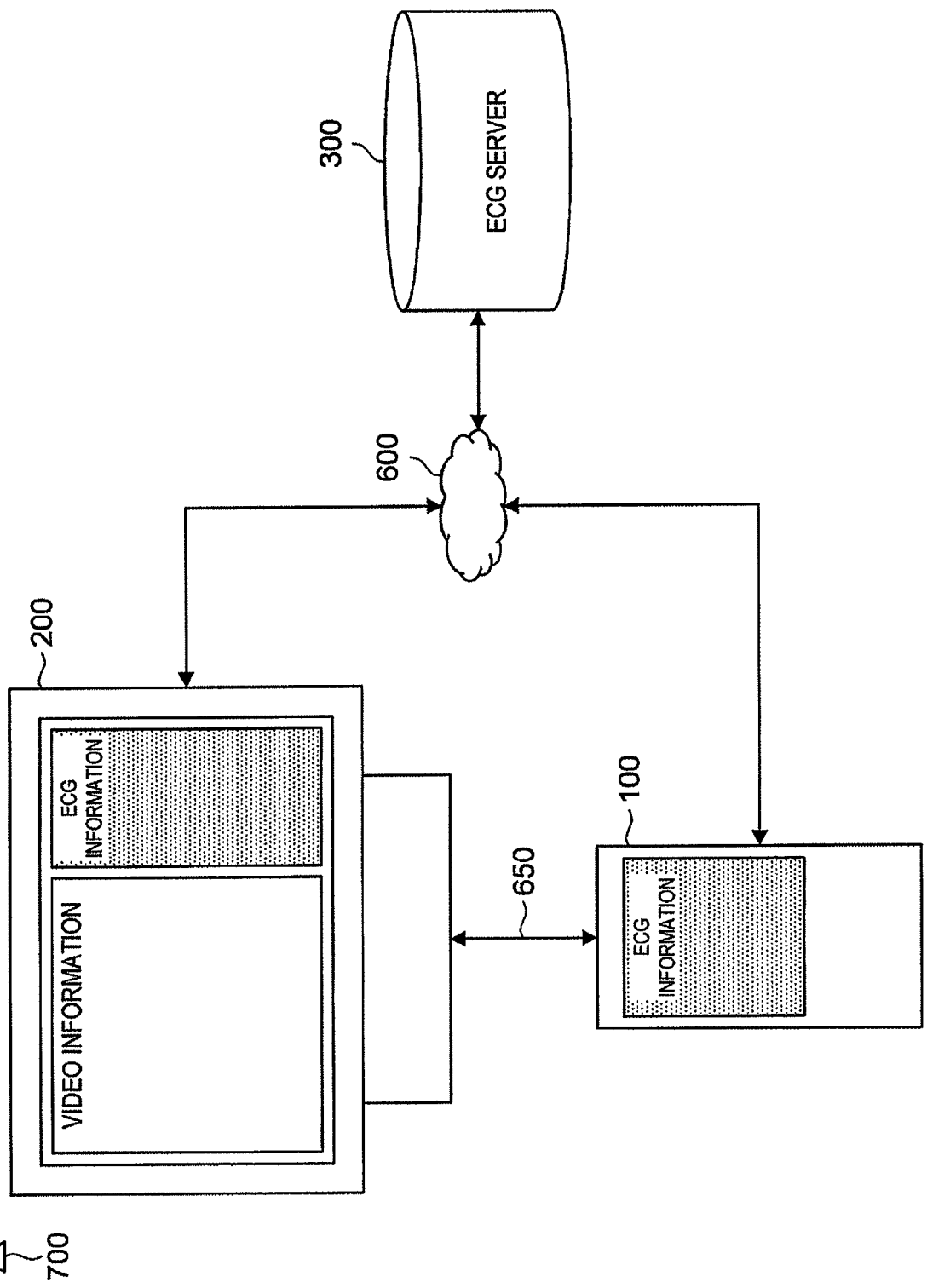

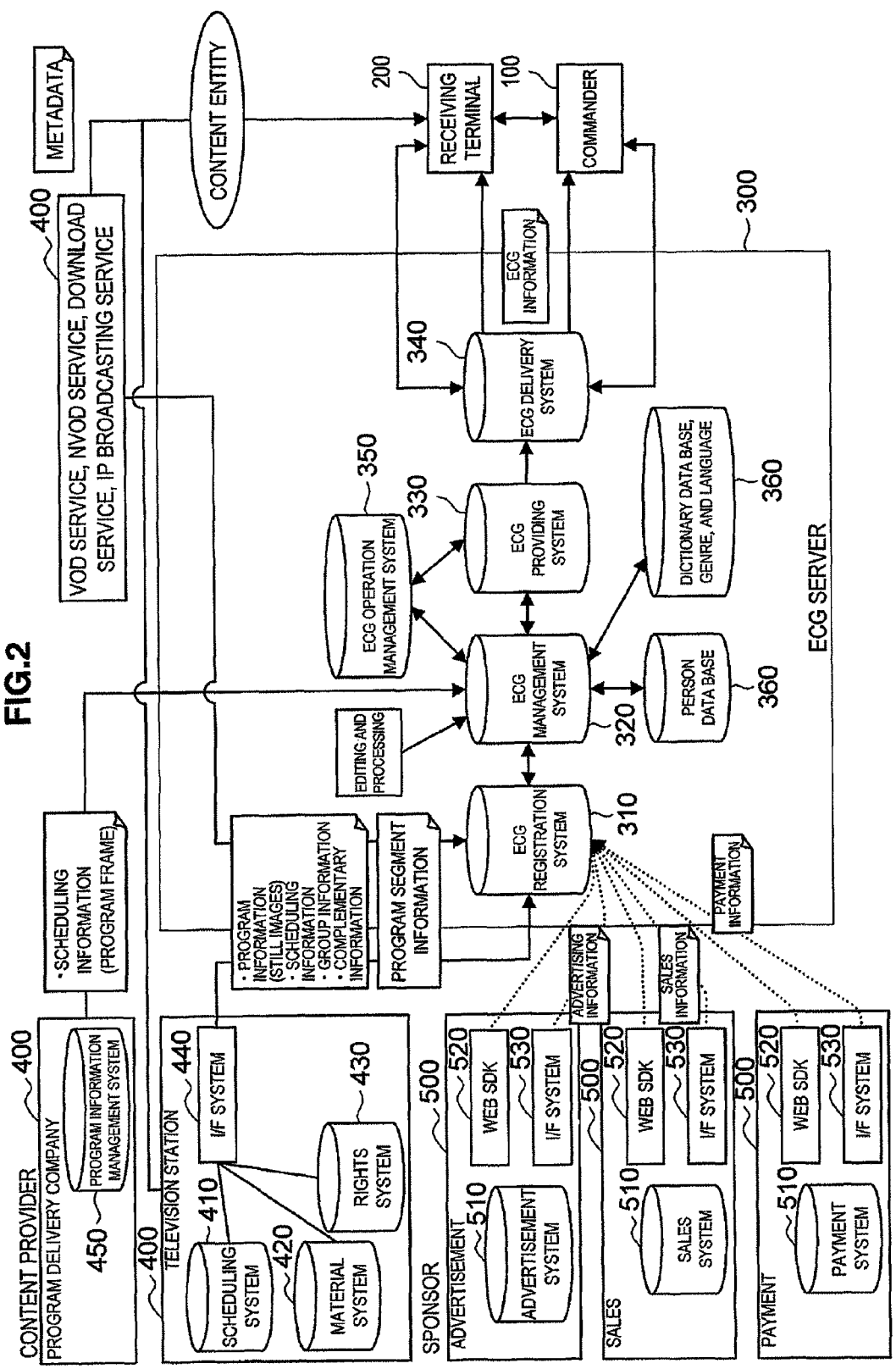

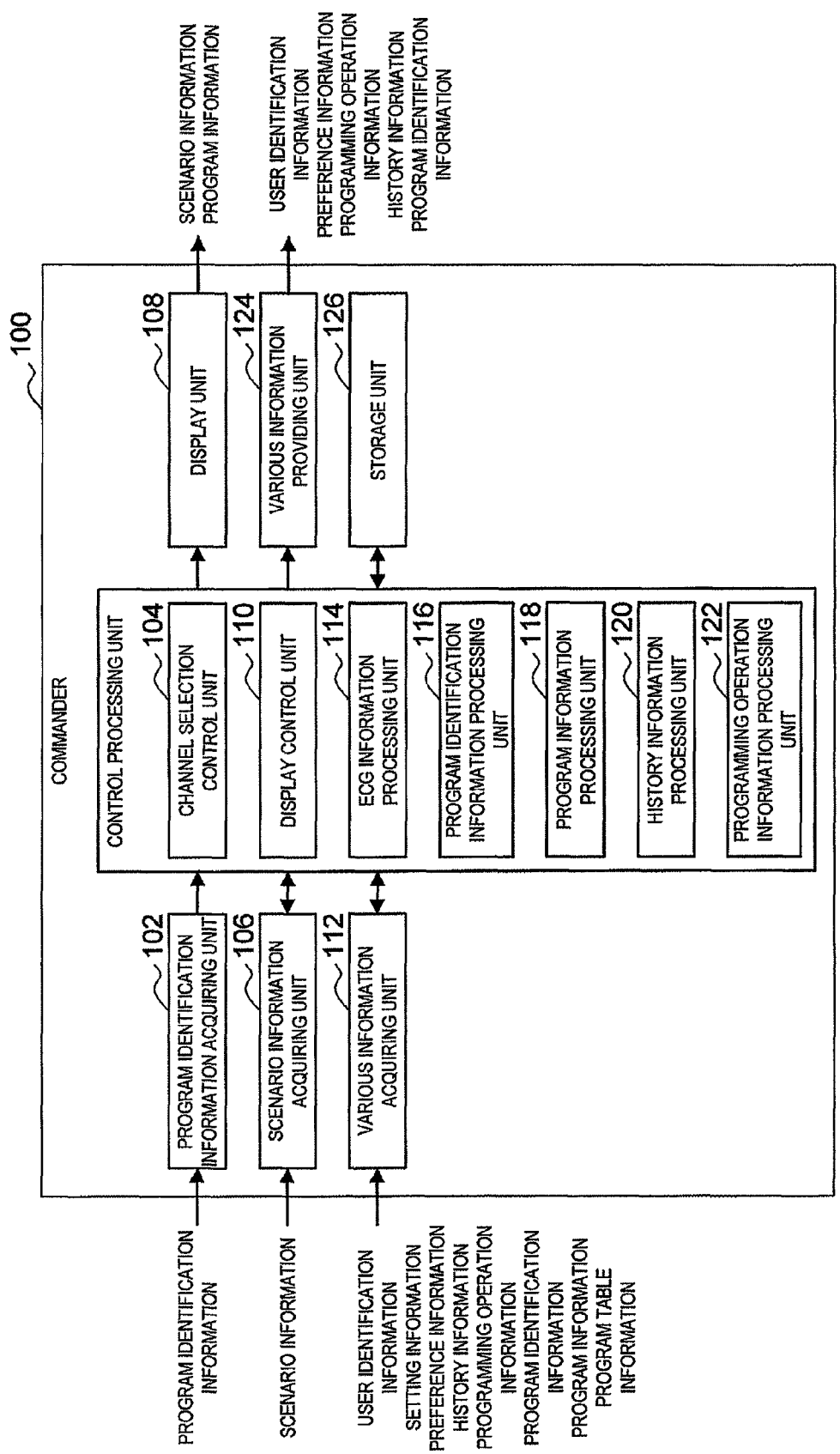

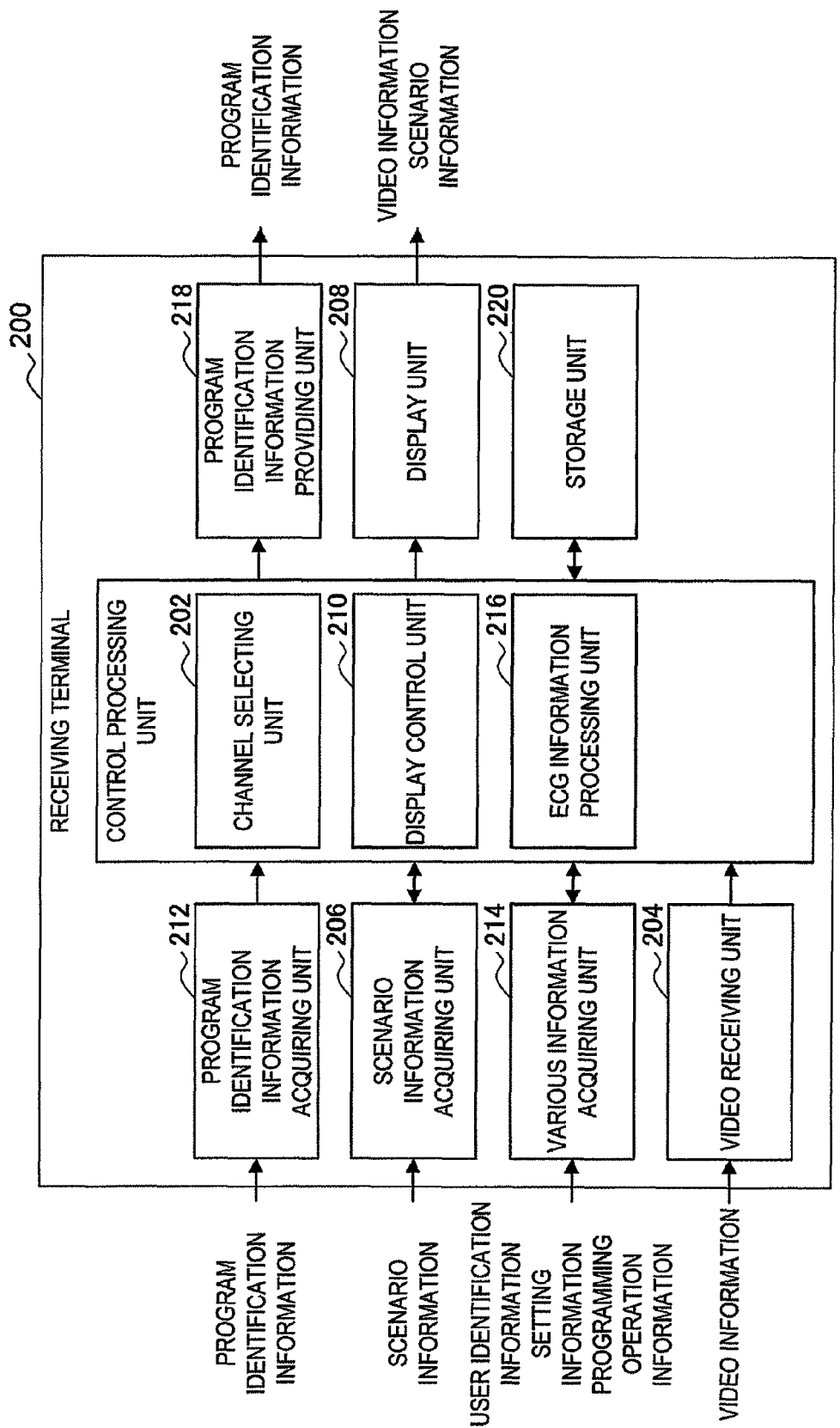

FIG.6A

```
<program id="P00001" name="STYLE OF PROFESSIONAL" genre="DOCUMENTARY" keywords="AAA BBB KNOW-HOW AND EMOTION" relation_ref ="sc00001" >
<oa start_date="2007/7/10" start_time="22:00:00" end_date="2007/7/10" end_time="23:00:00" logo_image="p00001.jpg"/>
    <details>
        <CreditsList>
            <Person id="1_1" name="AAA"  Birthplace="Japan" image="person1.jpg"/>
            <Person id="1_2" name="BBB" Birthplace="Japan"/>
            <Person id="1_3" name="CCC" Birthplace="Japan"/>
        </CreditsList>
    </details>
</oa>
</program>
```

FIG.6B

```
<content id="C00001" name="MERCHANDISE 1" genre="PUBLICATION" keywords="XXX YYY ZZZ" maker="zony" price="100 YEN" content_info="www.zony.co.jp" image="c00001.jpg"/>
```

FIG.6C

```
<ecg_scenario id="sc00001" name="ECG SCENARIO" start_date="2007/7/1" start_time="00:00:00" end_date="2007/7/20" end_time="00:00:00" memo="BROADCAST TIME 2007/7/10 FROM AT 22 TO 23" >
    <ecg_set_content id="ecg_set_c1" ecg_set_id="es00001" />
    <ecg_set_content id="ecg_set_c2" ecg_set_id="es00002" />
</ecg_scenario>
```

FIG.7A

```xml
<ecg_set id="es00001" name="ECG SET 1" start_date="2007/7/1" start_time="00:00:00" end_date="2007/7/20" end_time="00:00:00" terminal="RECEIVING TERMINAL">
  <ecg_set version="1.0">
  <content id="c11" type="program" program_id="P011" start_date="2007/7/1" start_time="00:00:00" end_date="2007/7/10" end_time="22:00:00" />
  <content id="c12" type="program" program_id="P012" start_date="2007/7/10" start_time="22:00:00" end_date="2007/7/10" end_time="23:00:00" />
  <content id="c13" type="program" program_id="P013" start_date="2007/7/10" start_time="23:00:00" end_date="2007/7/20" end_time="00:00:00" />
  <content id="c14" type="product" content_id="C011" start_date="2007/7/1" start_time="00:00:00" end_date="2007/7/20" end_time="00:00:00" />
</ecg_set>
```

FIG.7B

```xml
<ecg_set id="es00002" name="ECG SET 2" start_date="2007/7/1" start_time="00:00:00" end_date="2007/7/20" end_time="00:00:00" terminal="COMMANDER">
  <ecg_set version="1.0">
  <content id="c21" type="program" program_id="P021" start_date="2007/7/1" start_time="00:00:00" end_date="2007/7/10" end_time="23:00:00" />
  <content id="c22" type="program" program_id="P022" start_date="2007/7/10" start_time="23:00:00" end_date="2007/7/20" end_time="00:00:00" />
  <content id="c23" type="product" content_id="C021" start_date="2007/7/1" start_time="00:00:00" end_date="2007/7/20" end_time="00:00:00" />
</ecg_set>
```

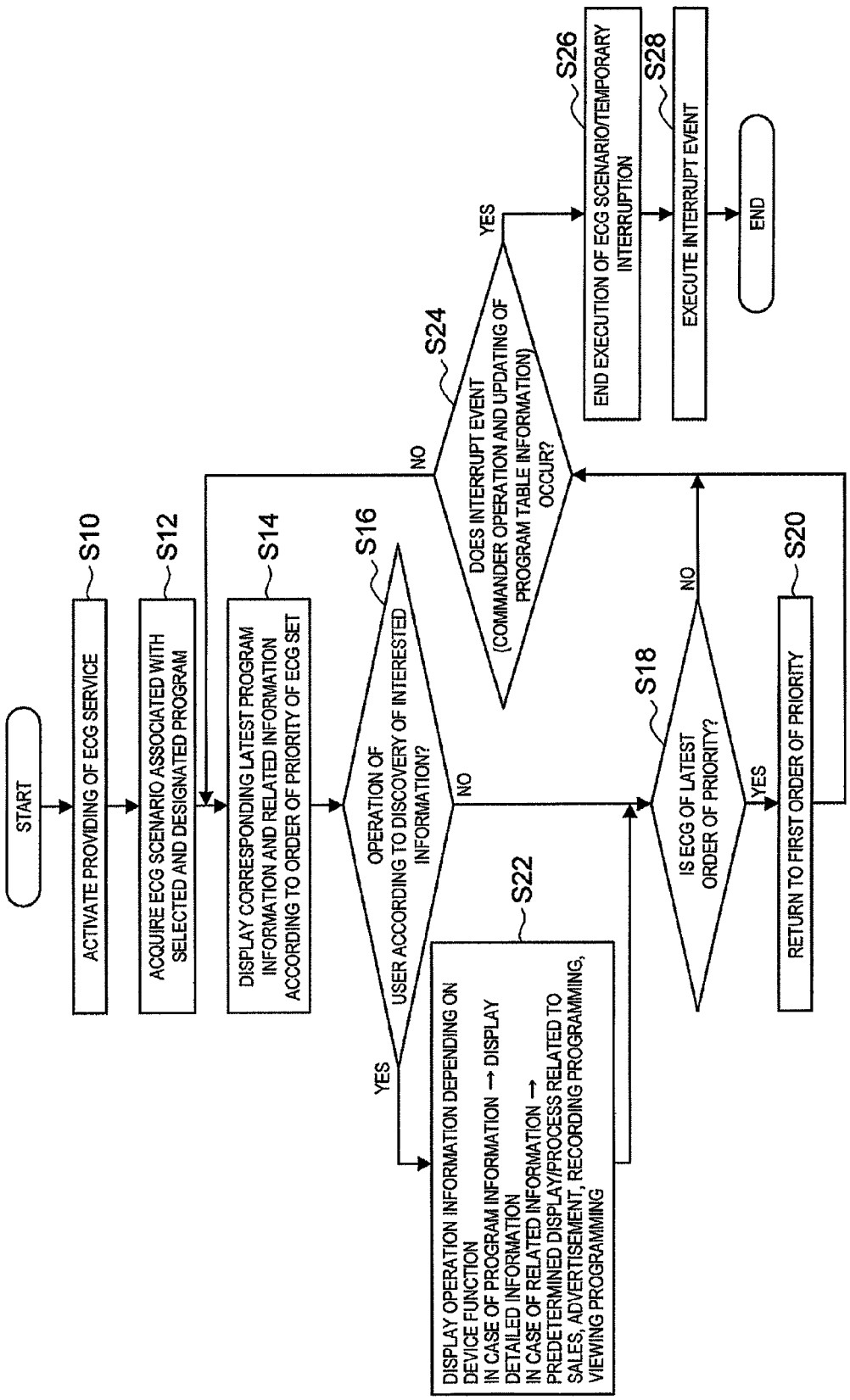

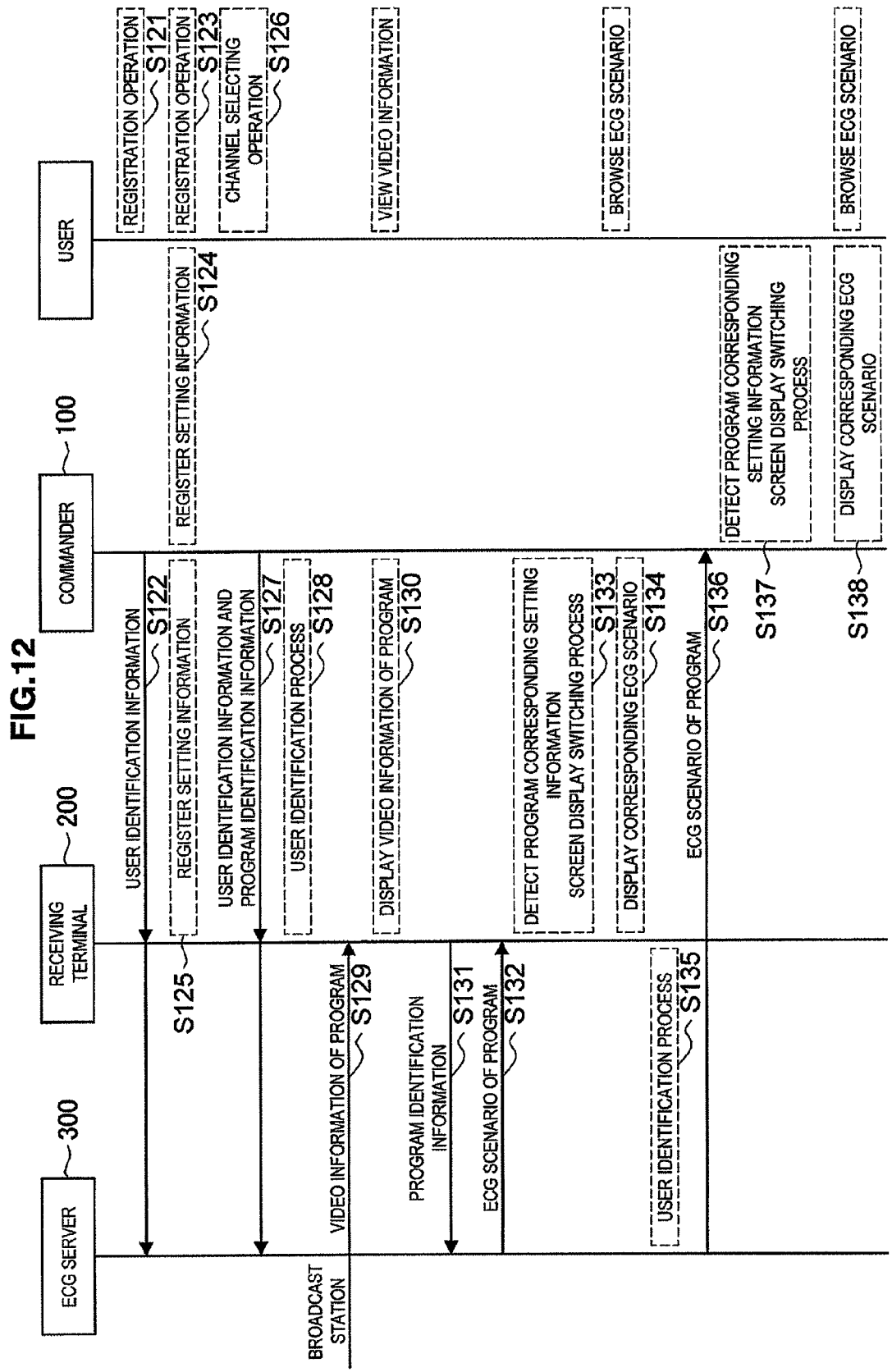

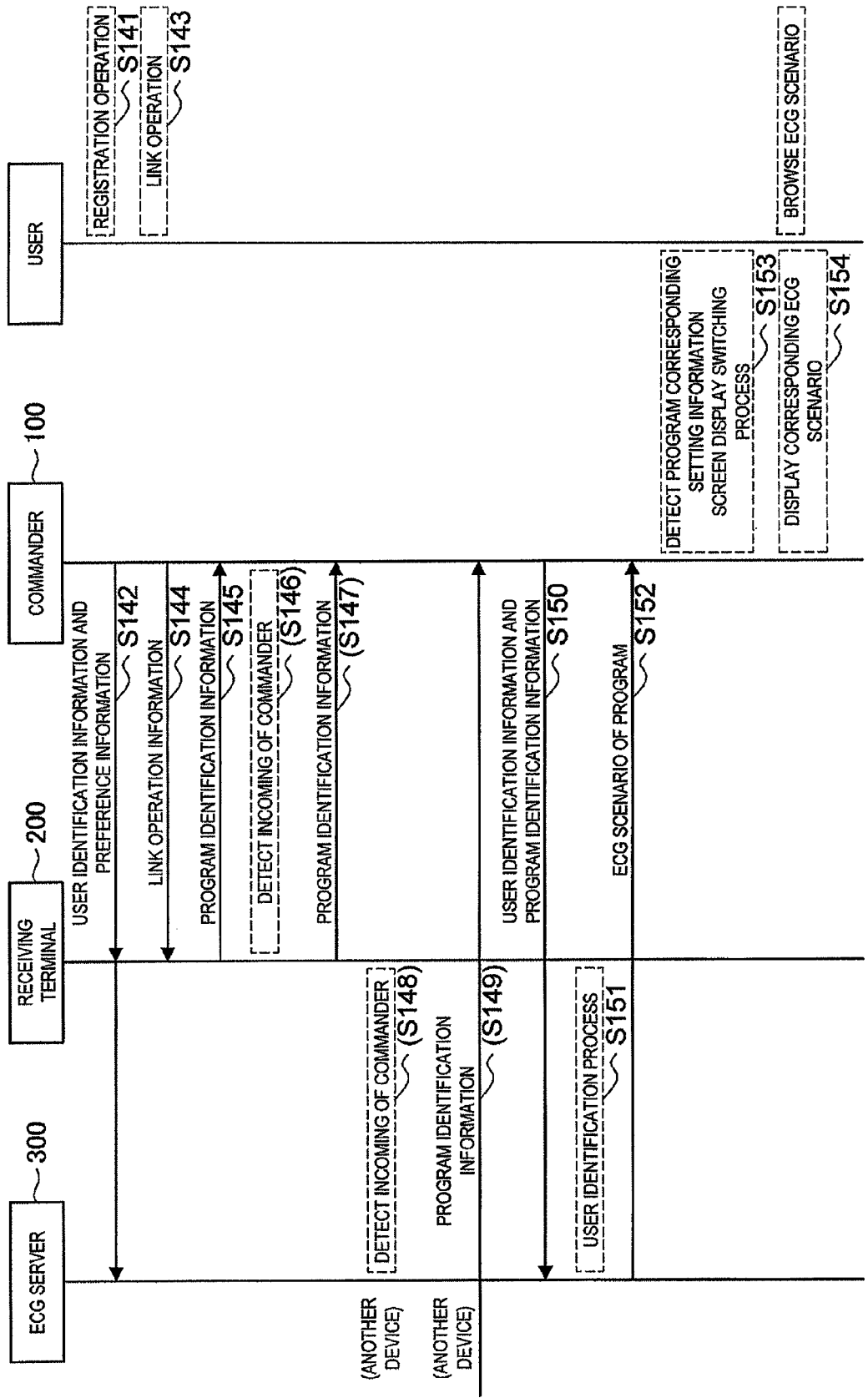

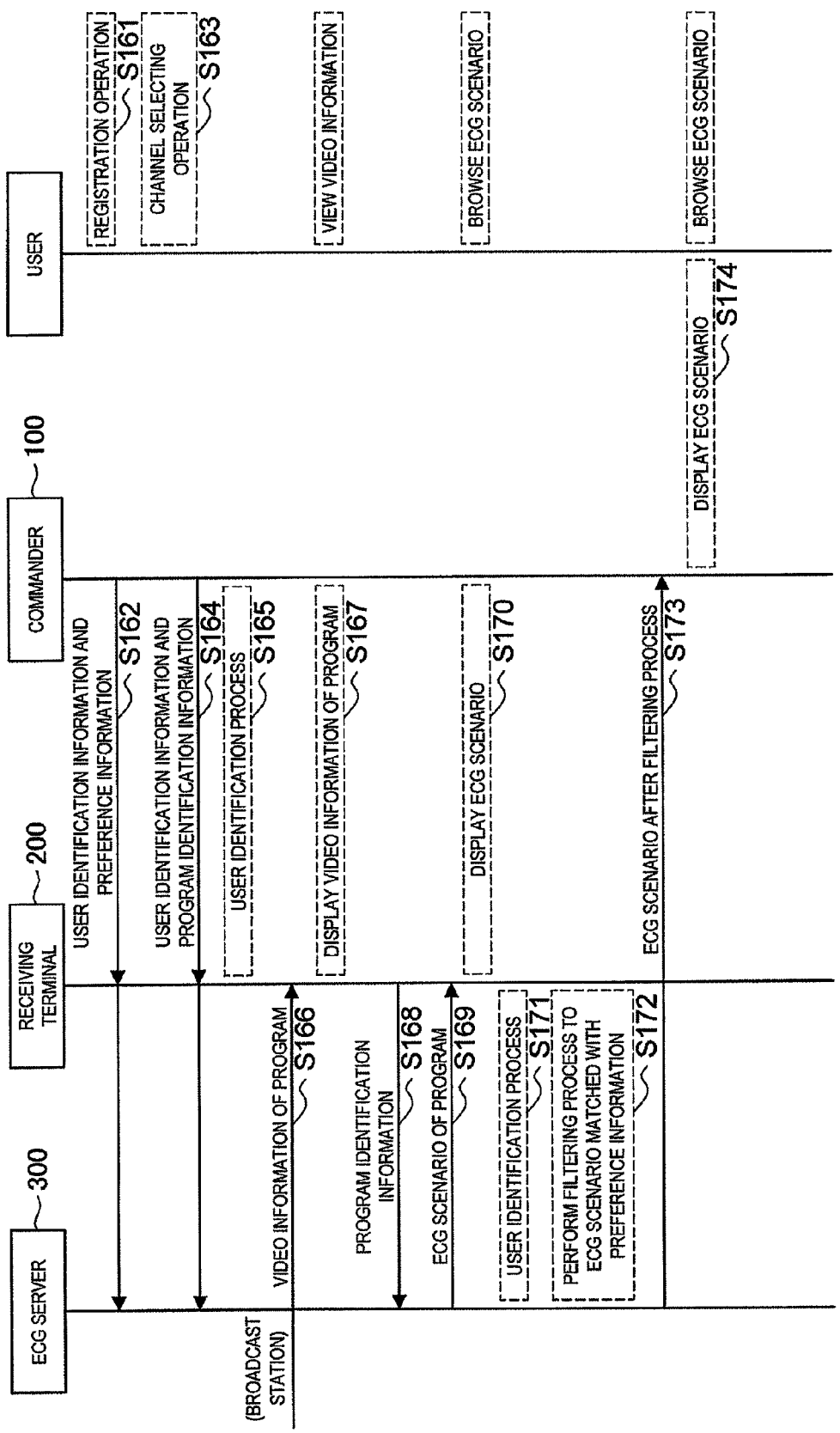

REMOTE CONTROL TERMINAL, INFORMATION ACQUIRING APPARATUS, INFORMATION PROVIDING APPARATUS, INFORMATION PROVIDING SYSTEM, INFORMATION PROVIDING METHOD, AND PROGRAM

CROSS REFERENCES TO RELATED APPLICATIONS

The present invention contains subject matter related to Japanese Patent Application JP 2007-291178 filed in the Japan Patent Office on Nov. 8, 2007, the entire contents of which being incorporated herein by reference.

BACKGROUND OF THE INVENTION

Field of the Invention

The present invention relates to a remote control terminal, an information acquiring apparatus, an information providing apparatus, an information providing system, an information providing method, and a program.

In recent years, in conjunction with provision of video and audio information of a program, a system which provides program meta information including a program guide, program information, related information of a program, and the like is popularized. As the program meta information, EPG-SI (Electronic Program Guide—Service Information) information, Electronic Content Guide (ECG) information, and the like are known. A user of a system of this type watches program meta information, in addition to video information of a program which is acquired by a receiving terminal such as a television receiver and displayed on a display screen of the receiving terminal.

SUMMARY OF THE INVENTION

In general, program meta information is displayed to be superposed on video information displayed on the display screen of a receiving terminal or to be parallel to video information reduced-displayed on a part of the display screen. For this reason, for example, when a plurality of viewers watch a program, a viewer who wants to watch video information may feel bothered by a display of the program meta information displayed together with the video information. On the other hand, when the display of the program meta information is temporarily stopped by a changing operation or the like of the screen display, a viewer who wants to browse the program meta information cannot temporarily browse the program meta information and may feel inconvenienced. Even though a single viewer watches a program, the viewer may feel troubled by operations of temporarily stopping the display of the program meta information and restarting the display.

In general, program meta information is displayed as information inherent in a program on the display screen of a receiving terminal. For this reason, since the information inherent in the program is displayed regardless of the preference of the viewer, a specific viewer may feel bothered by a display of program meta information which is not suitable for her/his own preference.

In general, program meta information is acquired by a receiving terminal in conjunction with watching of a program and displayed. For this reason, it is difficult that a viewer can browse program meta information of another program while watching video information of a specific program, or, even though the viewer browses the program meta information, the viewer may be requested to perform a cumbersome operation.

In general, program meta information is acquired by a receiving terminal such as a television receiver or the like and displayed. For this reason, a range of usage of the program meta information is limited, and it is difficult to achieve promotion of utilization.

It is desirable to provide a remote control terminal, an information acquiring apparatus, an information providing apparatus, an information providing system, an information providing method, and a program which make it possible to efficiently browse program meta information and effectively provide the program meta information.

According to a first embodiment of the present invention, there is provided a remote control terminal which can communicate with an information providing apparatus which provides electronic content guide information related to a program and an information acquiring apparatus which acquires and displays video information of the program and the electronic content guide information, and which can remote-control the information acquiring apparatus. This remote control terminal includes: a program identification information acquiring unit which acquires program identification information to designate a program watched by using the information acquiring apparatus; a channel selection control unit which remote-controls a channel selecting process by the information acquiring apparatus based on the acquired program identification information; a scenario information acquiring unit which acquires scenario information included in the electronic content guide information related a program to be watched based on the acquired program identification information; a display unit which displays the scenario information related to the program to be watched; and a display control unit which can control the display unit such that a display state of the scenario information related to the program to be watched is changed depending on a display state of the scenario information in the information acquiring apparatus based on predetermined setting information or predetermined operation information.

According to the configuration, in the remote control terminal, when the remote control of the channel selecting process is performed, based on the program identification information to designate the program watched by using the information acquiring apparatus, scenario information related to the program to be watched is acquired from the information providing apparatus. Based on the setting information or the operation information, depending on the display state of the scenario information in the information acquiring apparatus, the display unit is controlled such that the display state of the scenario information related to the program to be watched is changed. In this manner, in the remote control terminal, since the scenario information in different display states can be displayed depending on the display state of the scenario information in the information acquiring apparatus, a user can efficiently browse the scenario information (program meta information) related to the program to be watched.

When a display of the scenario information is stopped in the information acquiring apparatus, the display control unit may control the display unit to display the scenario information the display of which is stopped. In this manner, since the scenario information the display of which is stopped by the information acquiring apparatus is displayed in the remote control terminal, a user can watch only the video information by the information acquiring apparatus and efficiently browse the scenario information by the remote control terminal.

When the scenario information is displayed by the information acquiring apparatus, the display control unit may control the display unit to display scenario information different from the scenario information displayed by the information acquiring apparatus. In this manner, in the remote control terminal, since the scenario information different from the scenario information displayed by the information acquiring apparatus is displayed, a user can browse overall information in the information acquiring apparatus and can efficiently browse detailed information in the remote control terminal.

The display control unit may control the display unit to display scenario information matched with preference information preset for each user. In this manner, since the scenario information matched with the preference information preset for the user is displayed in the remote control terminal, a user can efficiently browse scenario information matched with her/his own preference.

The remote control terminal may further include a program identification information communication unit which communicates program identification information to specify the watched program to at least any one of the information acquiring apparatus and another communication control terminal. In this manner, since the program identification information is communicated between the information acquiring apparatus and the remote control terminal and/or a plurality of remote control terminals, the user can efficiently browse scenario information related to the watched program without remote-controlling the channel selecting process.

The remote control terminal may further include a program information acquiring unit which acquires program information included in an electronic content guide information and expressing a watchable program. The program identification information acquiring unit may acquire program identification information to specify a program corresponding to designated program information of the pieces of acquired program information, and the display control unit may control the display unit to update display of the program information changed with passage of time on real time. In this manner, since the display of the program information to specify the watchable program is updated on real time, the user can select a desired program based on the updated program information and can efficiently browse the scenario information.

The remote control terminal may further include a history information storage unit which stores at least any one of program identification information to specify a program watched for a predetermined period of time or more, identification information of scenario information acquired with respect to the watched program, and the scenario information. The display control unit may control the display unit to display at least any one of the scenario information acquired from the information providing apparatus based on the stored program identification information or the identification information of the scenario information and the stored scenario information. In this manner, since the scenario information related to the watched program is displayed based on history information stored in advance, a user can efficiently browse the scenario information related to the watched program.

The program information acquiring unit may acquire program information expressing at least any one of a program which was provided in the past, a program which is being provided at the present, and a program which will be provided in the future from the information providing apparatus, the program identification information acquiring unit may acquire program identification information to specify a program corresponding to designated program information of pieces of acquired program information, the scenario information acquiring unit may acquire the scenario information related to a program corresponding to the acquired program identification information from the information providing apparatus, and the display control unit may control display displays of the acquired program information and the scenario information. In this manner, since the pieces of scenario information related to the past, present, and future programs are acquired based on the acquired program identification information, a user can efficiently browse the scenario information related to a program except for the program which is being watched.

The remote control terminal may further include a history information updating unit which, when the remote control terminal communicates with another remote control terminal and stores updated scenario information newer than its own stored scenario information in the other remote control terminal, updates its own stored scenario information by the scenario information acquired from the other remote control terminal. In this manner, since its own stored scenario information is updated by the new scenario information acquired from the other remote control terminal, a user can efficiently browse the updated scenario information of the program.

The remote control terminal further include a programming operation process unit which acquires and stores programming operation information to a program which will be provided in the future and provides the stored programming operation information to at least any one of the information acquiring apparatus, another information acquiring apparatus, and information recording apparatus. In this manner, since the pre-stored programming operation information is provided to the information acquiring apparatus, another information acquiring apparatus, and information recording apparatus, a user can efficiently perform watching programming, recording programming, and the like of a program based on the pre-stored programming operation information.

According to a second embodiment of the present invention, there is provided an information acquiring apparatus which can communicate with an information providing apparatus which provides electronic content guide information related to a program and a remote control terminal which acquires and displays the electronic content guide information and which can remote-control the information acquiring apparatus, and which acquires and displays video information and the electronic content guide information of the program. This information acquiring apparatus includes: a channel selecting unit which performs a channel selecting operation based on program identification information provided from a remote control terminal; a video information receiving unit which receives video information of a program to be watched; a scenario information acquiring unit which acquires scenario information included in the electronic content guide information related to the program to be watched based on the program identification information; a display unit which displays the video information of the program and the scenario information related to the program to be watched; and a display control unit which can control the display unit to change a display state of the scenario information related to the program to be watched depending on a display state of the scenario information on the remote control terminal based on predetermined setting information or predetermined operation information.

According to the configuration, in the information acquiring apparatus, in the remote control of the channel selecting process, based on the program identification information provided from the remote control terminal, the video information of the program to be watched from the program providing apparatus, and the scenario information related to the program to be watched is acquired from the information providing apparatus. The display unit is controlled such that the display state of the scenario information related to the program to be watched is changed depending on the display state of the scenario information on the remote control terminal based on setting information or operation information. In this manner, since scenario information can be displayed in different display states depending on the display state of the scenario information on the remote control terminal in the information acquiring apparatus, a user can efficiently browse the scenario information (program meta information) related to a program to be watched.

The information acquiring apparatus may further include a program identification information providing unit which provides program identification information to specify the watched program to the remote control terminal. In this manner, since the program identification information to specify the program to be watched is provided to the remote control terminal, a user can efficiently browse the scenario information related to the program to be watched through the remote control terminal without performing remote control of the channel selecting process.

According to a third embodiment of the present invention, there is provided an information providing apparatus which can communicate with an information acquiring apparatus which acquires video information and electronic content guide information of a program and a remote control terminal which acquires and displays the electronic content guide information and which can remote-control the information acquiring apparatus, and which provides the electronic content guide information related to the program. The information providing apparatus includes: a scenario information storage unit which stores scenario information included in the electronic content guide information related to a program in association with program identification information; and a scenario information providing unit which provides, based on the program identification information provided by the information acquiring apparatus and the remote control terminal, scenario information which is related to a program watched by using the information acquiring apparatus and which is configured to be able to be displayed in different display states between the information acquiring apparatus and the remote control terminal to the information acquiring apparatus and the remote control terminal.

According to the configuration, in the information providing apparatus, in remote control of a channel selecting process, based on the program identification information provided from the information acquiring apparatus and the remote control terminal, the scenario information which is related to the program to be watched by using the information acquiring apparatus and which is configured to be able to be displayed in different display states between the information acquiring apparatus and the remote control terminal to the information acquiring apparatus and the remote control terminal is provided. In this manner, since the scenario information can be displayed in the different display states between the information acquiring apparatus and the remote control terminal, an information provider can effectively provide scenario information (program meta information) related to a program to be watched.

The information providing apparatus further includes a preference information storage unit which stores preference information preset for each user of the remote control terminal in association with user identification information, and the scenario information providing unit may provide scenario information matched with preference information of the user based on the user identification information provided from the remote control terminal. In this manner, since the scenario information matched with the preference information preset for each user is provided, an information provider can effectively provide scenario information matched with the preference of the user.

According to a fourth embodiment of the present invention, there is provided an information providing system in which an information providing apparatus according to a first aspect of the present invention, an information acquiring apparatus according to a second aspect of the present invention, and a remote control terminal according to a third aspect of the present invention can communicate with each other.

According to a fifth embodiment of the present invention, there is provided an information providing method applied to an information providing system in which an information providing apparatus which provides electronic content guide information related to a program, an information acquiring apparatus which acquires and displays video information and the electronic content guide information of the program, and a remote control terminal which can remote-control the information acquiring apparatus can communicate with each other. The information providing method includes the steps of: acquiring program identification information to designate a program watched by using the information acquiring apparatus; remote-controlling a channel selecting process by the information acquiring apparatus based on the acquired program identification information; acquiring scenario information included in the electronic content guide information related a program to be watched based on the acquired program identification information; displaying the scenario information related to the program to be watched; and controlling a display of the scenario information to change a display state of the scenario information related to the program to be watched is changed depending on a display state of the scenario information in the information acquiring apparatus based on predetermined setting information or predetermined operation information.

According to a sixth embodiment of the present invention, there is provided a program to cause a computer to execute an information providing method according to the fifth aspect of the present invention. This program may be described in any program language.

According to the embodiments of the present invention described above, a remote control terminal, an information acquiring apparatus, an information providing apparatus, an information providing system, an information providing method, and a program which make it possible to efficiently browse program meta information and to effectively provide the program meta information.

BRIEF DESCRIPTION OF THE DRAWINGS

FIG. 1 is an explanatory diagram conceptually showing an entire configuration of an information providing system according to an embodiment of the present invention;

FIG. 2 is an explanatory diagram illustrating a model of the entire configuration of the information providing system;

FIG. 3 is a block diagram showing main constituent elements of a commander;

FIG. 4A is a block diagram showing main constituent elements of a receiving terminal;

FIG. 6A is an explanatory diagram illustrating meta data (information which associates a program with the ECG scenario) constituting the ECG scenario;

FIG. 6B is an explanatory diagram illustrating meta data (related information) constituting an ECG scenario;

FIG. 6C is an explanatory diagram illustrating meta data (ECG scenario) constituting the ECG scenario;

FIG. 7A is an explanatory diagram illustrating meta data (ECG set) constituting the ECG scenario;

FIG. 7B is an explanatory diagram illustrating meta data (ECG set) constituting the ECG scenario;

FIG. 8 is a flow chart showing a process flow in execution of the ECG scenario;

FIG. 12 is a sequential diagram illustrating a method of a changing process of the display screens shown in FIGS. 11A and 11B;

FIG. 13 is a sequential diagram illustrating another method which links a watching channel;

FIG. 15 is a sequential diagram illustrating a method of a changing process of the screen displays shown in FIGS. 14A and 14B.

DETAILED DESCRIPTION OF THE PREFERRED EMBODIMENTS

Figure 4B:
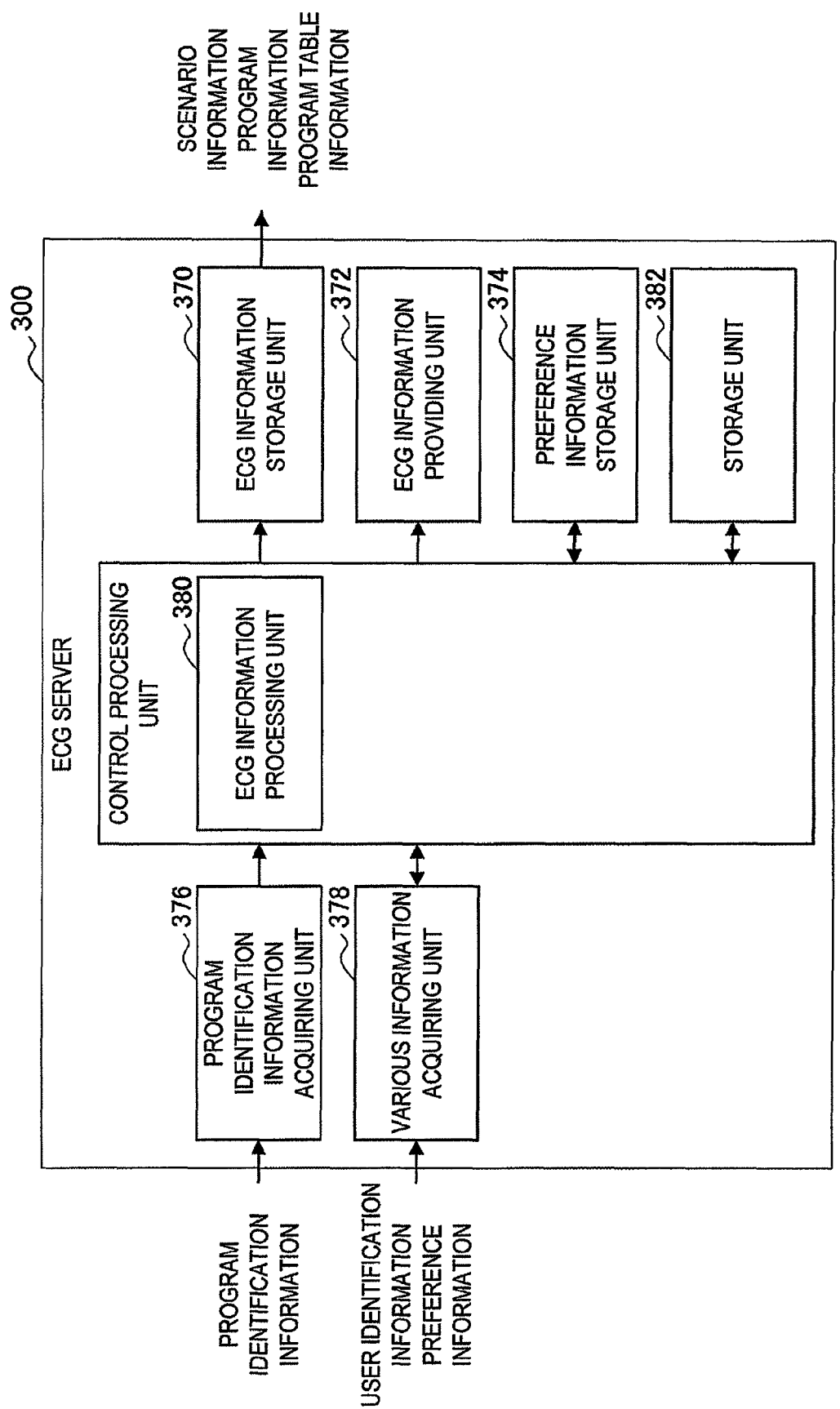
FIG. 4B is a block diagram showing main constituent elements of an ECG server.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

(Entire Configuration of Information Providing System)

FIG. 1 is an explanatory diagram conceptually showing an entire configuration of an information providing system according to an embodiment of the present invention. As shown in FIG. 1, the information providing system includes a commander 100 (remote control terminal), a receiving terminal 200 (information acquiring apparatus) of a user, and an ECG server 300 (information providing 15/67 apparatus).

The commander 100 acquires ECG information related to a program from the ECG server system 300 through a communication network 600. The commander 100 performs one-way or two-way communication with the receiving terminal 200 to remote-control the receiving terminal 200 through a short-distance communication 650.

The receiving terminal 200 acquires video and audio information or the like related to a program from a content provider 400 (program providing apparatus) through a receiving antenna 700 or the like. The receiving terminal 200 receives ECG information related to a program from the ECG server 300 through a communication network 600. In the receiving terminal 200, when provision of an ECG service is active, for example, the ECG information is displayed to be superposed on or parallel to the video information of the program.

The ECG server 300 registers and manages the information related to the program as ECG information, and provides the registered and managed ECG information to the commander 100 and the receiving terminal 200 through the communication network 600. In this case, as the ECG information, unlike data broadcasting information and EPG-SI information with which information related to a program is directly associated as information inherent in the program, information managed for each program and related to the program is indirectly associated with the program through program scheduling information.

FIG. 2 is an explanatory diagram illustrating a model of the entire configuration of the information providing system. As shown in FIG. 2, the information providing system includes the commander 100, the receiving terminal 200, the ECG server 300, the content provider 400, and a sponsor 500.

The content provider 400 is a program provider including, for example, a television broadcast station, a data broadcast station, a program delivery company, or the like. The content provider 400 operates, for example, systems such as a scheduling system 410, a material system 420, a right system 430, or the like which manage program information related to a program. The content provider 400 provides video and audio information related to a program, data broadcast information, and EPG-SI information to the receiving terminal 200 and provides program information related to the program and detailed information (will be described later) to the ECG server 300. In this case, the information related to the program includes program information (also including still image information or the like), scheduling information, group information, complementary information, and information such as segment information of the program (The pieces of information are generally called pieces of program information hereinafter.).

The sponsor 500 includes an advertising company, a sales company, or a payment agent which provide, for example, an advertising service, a sales service, a payment service, or the like. Depending on conditions, the sponsor 500 includes a content provider which provides video and audio information related to a program. The sponsor 500 operates, for example, an information processing system 510, a Web SDK (Software Development Kit) 520, an interface (I/F) system 530, and the like the sponsor 500 provides related information related to a program including advertising information, sales information, payment information, program information, and the like to the commander 100 and the receiving terminal 200 through the ECG server 300.

(Configuration of Commander)

The commander 100 may be, for example, a mobile information terminal such as a remote controller which is dedicated to the receiving terminal 200, a general-purpose remote controller, a mobile telephone, or a PDA (Personal Digital Assistant). The commander 100 generally includes an input operation unit, a communication unit, a storage unit, a control processing unit, and the like.

The input operation unit includes an operation button and/or an operation switch to remote-control the receiving terminal 200, an input button to input various pieces of information, and the like. As an example of the operation button, a channel selecting button, a recording/reproducing button, a direction button, a determination button, a link operation button, an EPG-SI information acquiring button, a data broadcast information acquiring button, an ECG information acquiring button to activate an ECG service, or the like is given. When the commander 100 is a mobile telephone or a mobile information terminal such as a PDA, various functions to remote-control the receiving terminal 200 may be allocated to the general-purpose operation button and the like.

A user directly operates the channel selecting button or the direction button and the determination button on a channel selecting menu displayed on program table information (will be described later) to make it possible to remote-control the channel selecting process by the receiving terminal 200. The user operates the operation button and/or the input button to make it possible to input or select various pieces of information such as setting information, preference information, user identification information, and programming operation information (all the pieces of information will be described later) can be input or selected.

The communication unit includes a communication device to communicate with the ECG server 300 through the communication network 600 or communicate with an external apparatus including the receiving terminal 200 through a short-distance communication 650. The display unit includes, for example, a display device such as a liquid crystal panel to display various pieces of information including ECG information or a touch panel also functioning as an input operation unit.

The storage unit stores various pieces of information such as ECG information, setting information, preference information, user identification information, programming operation information, and a program to perform process control of the commander 100. The control process unit processes the various pieces of information such as the ECG information, the setting information, the preference information, the user identification information, and programming operation information and controls all the functions of the commander 100.

(Configuration of Receiving Terminal)

The receiving terminal 200 may be, for example, a television receiver, a mobile information terminal, a broadcasting receiving terminal such as a mobile terminal, an STB (Set Top Box), a CATV (Common Antenna Television) terminal, an IPTV (Internet Protocol Television) terminal, a PVR (Personal Video Recorder), a PC (Personal Computer), a mobile telephone, a PDA, or the like.

The receiving terminal 200 communicates with an external system and an external device through the communication network 600 including an optical fiber, an ADSL (Asymmetric Digital Subscriber Line), a telephone modem, an electric power line, or wireless transmission. The receiving terminal 200 receives, through a receiving antenna 700 or the like, a program provided through various transmission paths such as terrestrial analog broadcasting, terrestrial digital broadcasting, BS (Broadcast Satellite) analog broadcasting, BS digital broadcasting, 124/128 degrees CS (Communication Satellite) broadcasting, 110 degrees CS broadcasting, CATV digital broadcasting, CATV analog broadcasting, and optical fiber broadcasting.

The receiving terminal 200 includes a broadcast processing unit, an ECG information processing unit, a display unit, a device control unit. In this case, the broadcast processing unit has a function of receiving video and audio information and data broadcasting information and recording/reproducing the information as needed, a function of controlling reception of the EPG-SI information, and the like. The ECG information processing unit has a function of acquiring ECG information, a function of causing a user to browse ECG information, a function of controlling processing of the ECG information, and the like.

The receiving terminal 200 acquires operation information by a user through a device control unit or the like directly or through the commander 100 to perform various control processes. The device control unit controls a device to perform communication with the commander 100 which remote-controls the receiving terminal 200.

(Configuration of ECG Server)

With reference to FIG. 2, the ECG server 300 will be described below. The ECG server 300 is operated by an information service provider which provides information related to a program. The ECG server 300 includes an ECG registration system 310, an ECG management system 320, an ECG providing system 330, an ECG delivery system 340, an ECG operation management system 350, various databases 360, and the like.

The ECG registration system 310 registers information (program information, related information, and the like) related to a program provided by the content provider 400 and the sponsor 500 and detailed information related to program information such as scheduling of the program, a cast, a genre, and music or an event related to the program.

The ECG management system 320 manages program information and related information registered in the ECG registration system 310, detailed information stored in the various databases 360, and the like. The ECG management system 320 performs various editing, processing, updating processes to the program information, the related information, and the detailed information. In particular, the ECG management system 320 produces the information related to the program as ECG data, associates the ECG data with each other, and gives orders of priority to the ECG data to edit the ECG data as an ECG scenario including the plurality of ECG data.

The ECG management system 320 edits and processes program information to produce program table information including scheduling information of a plurality of programs as ECG information. The program table information produced as the ECG information includes information such as program identification information, a type of a program, a providing channel, providing date and time, and an outline, and is updated on real time depending on a change in program scheduling.

The ECG providing system 330 provides the ECG information such as an ECG scenario, program information, and program table information managed by the ECG management system 320 to the commander 100 and the receiving terminal 200 through the ECG delivery system 340. The ECG delivery system 340 delivers, depending on a request, the ECG information provided from the ECG providing system 330 to the commander 100 and the receiving terminal 200. The ECG operation management system 350 controls the ECG management system 320 and the ECG providing system 330 to operate and manage the entire system of the ECG server 300.

(Constituent Element of Information Providing System)

FIGS. 3, 4A and 4B are block diagrams showing main constituent elements of the information providing system according to the embodiment. FIG. 3 shows the commander 100, and FIGS. 4A and 4B show the receiving terminal 200 and the ECG server 300, respectively.

(Constituent Element of Commander)

The commander 100 shown in FIG. 3 includes a program identification information acquiring unit 102, a channel selection control unit 104, a scenario information acquiring unit 106, a display unit 108, and a display control unit 110. The commander 100 further includes a various-information acquiring unit 112, an ECG information processing unit 114, a program identification information processing unit 116, a program information processing unit 118, a history information processing unit 120, a programming operation information processing unit 122, a various-information providing unit 124, and a storage unit 126.

In this case, the program identification information acquiring unit 102 acquires program identification information to designate a program to be watched by using the receiving terminal 200 through a channel selecting operation, a selecting operation, and the like by a user. The program identification information acquiring unit 102 also acquires program identification information to specify a program designated by the program information. The program specified by the program identification information includes past, present, and future programs. The channel selection control unit 104 provides the acquired program identification information to the receiving terminal 200 through the various-information providing unit 124 to remote-control the channel selecting process by the receiving terminal 200. In this case, the program identification information is information to specify an arbitrary program. The arbitrary program can be generally specified by information of a program providing medium (for example, a type of a transmission path such as a terrestrial analog broadcasting or terrestrial digital broadcasting), a providing channel, and providing date and time. However, when a program which is provided at the present is specified, the program can be specified by the information of the providing medium and the providing channel. When the type of the providing medium is single, the information of the providing medium is omitted. In place of the program identification information, identification information such as a program code including the above information to specify the arbitrary program may be used.

The scenario information acquiring unit 106 acquires, based on the acquired program identification information, scenario information (ECG scenario) included in the ECG information related to a watched or designated program from the ECG server 300. The display unit 108 displays the ECG information including the scenario information, and the program information, through the control by the display control unit 110.

The display control unit 110 can control the display unit 108 to change a display state of the scenario information related to a program to be watched depending on a display state of the scenario information in the receiving terminal 200 based on setting information registered in the storage unit 126 in advance, setting information given to the scenario information, or operation information acquired through a setting operation of a user. When the display of the scenario information is stopped in the receiving terminal 200, for example, the display control unit 110 controls the display unit 108 to display the scenario information the display of which is stopped, and/or when the display of the scenario information is performed in the receiving terminal 200, the display control unit 110 controls the display unit 108 to display scenario information different from the scenario information displayed on the receiving terminal 200. The display control unit 110 controls the display unit 108 to display scenario information matched with preference information preset for each user or to update the display of the program information changed with passage of time on real time. Furthermore, the display control unit 110 controls the display unit 108 to display at least any one of scenario information acquired from the ECG server 300 based on stored program identification information and the identification information of the scenario information, and the stored scenario information.

The various-information acquiring unit 112 acquires user identification information which can specify a user, setting information and preference information used in changing process of a screen display, and programming operation information used in a programming operation such as watching and recording programming of the program through an input operation or the like of the user. The various-information acquiring unit 112 acquires program table information including scheduling information of a program and program information expressing a program which can be watched or designated from the ECG server 300, acquires program identification information to specify the watched program from the receiving terminal 200 or another commander, and acquires latest history information stored in the other commander from the other commander.

The ECG information processing unit 114 processes ECG information such as the scenario information, the program information, the program table information, and the like acquired from the ECG server 300 or the other commander in cooperation with the display control unit 110, the various-information acquiring unit 112, the various-information providing unit 124, the storage unit 126, and the like.

The program identification information processing unit 116 performs a process to communicate the program identification information to specify a watched program between the receiving terminal 200 and/or the other commander in cooperation with the various-information acquiring unit 112, the various-information providing unit 124, and the like. The program information processing unit 118 acquires program information expressing past, present, and future programs from the ECG server 300 based on the program table information. When programs are changed with passage of time with respect to program information expressing a watchable program, the program information processing unit 118 updates the updated program information based on the program table information.

The history information processing unit 120 performs, in cooperation with the storage unit 126 or the like, a process to store the program identification information to specify a program watched for a predetermined period of time or longer and/or identification information of scenario information acquired with respect to a watched program and the scenario information. The history information processing unit 120 communicates with another commander in cooperation with the various-information acquiring unit 112, the various-information providing unit 124, the storage unit 126, and the like. When the history information processing unit 120 stores new scenario information updated from the scenario information stored therein in the other commander, the history information processing unit 120 updates the scenario information stored therein by the new scenario information acquired from the other commander.

The programming operation information processing unit 122 acquires and stores programming operation information for a program which will be provided in the future through a programming operation of a user in cooperation with the various-information providing unit 124, the storage unit 126, and the various-information acquiring unit 112. The programming operation information processing unit 122 performs a programming operation process which provides the stored programming operation information to at least any one of the receiving terminal 200, another receiving terminal, and an information recording apparatus such as an HDD or a DVD.

The various-information providing unit 124 provides various pieces of information such as the user identification information, the preference information, the programming operation information, the history information, the program identification information to specify a watched program to the ECG server 300, the receiving terminal 200, the other commander, and the like. The storage unit 126 stores the user identification information, the setting information, the preference information, the programming operation information, the history information (program identification information and ECG information (including identification information)), and the like.

(Constituent Element of Receiving Terminal)

The receiving terminal 200 shown in FIG. 4A includes a channel selecting unit 202, a video receiving unit 204, a scenario information acquiring unit 206, a display unit 208, and a display control unit 210. The receiving terminal 200 further includes a program identification information acquiring unit 212, a various-information acquiring unit 214, an ECG information processing unit 216, a program identification information providing unit 218, and a storage unit 220.

The channel selecting unit 202 performs a channel selecting process based on the program identification information provided from the commander 100. The video receiving unit 204 receives video information of a program to be watched from a broadcasting station based on the program identification information.

The scenario information acquiring unit 206 acquires scenario information related to a program to be watched from the ECG server 300 based on the program identification information. The display unit 208 displays the video information of the program and scenario information related to the program to be watched through the control of the display control unit 210.

The display control unit 210 can control the display unit 208 to change a display state of the scenario information related to the program to be watched depending on a display state of the scenario information in the commander 100 based on setting information registered in the storage unit 220 in advance, the setting information given to the scenario information, or operation information acquired through a setting operation of a user.

The program identification information acquiring unit 212 acquires the program identification information provided from the commander 100. The various-information acquiring unit 214 acquires various pieces of information such as the user identification information, setting information used in a screen display changing process, and programming operation information. The ECG information processing unit 216 processes the scenario information acquired from the ECG server 300 and the ECG information such as program information in cooperation with the display control unit 210 or the like. The program identification information providing unit 218 provides various pieces of information such as program identification information to specify a watched program to the commander 100. The storage unit 220 stores the pre-registered user identification information, the setting information, and the like.

(Constituent Element of ECG Server)

The ECG server 300 shown in FIG. 4B includes an ECG information storage unit 370 and an ECG information providing unit 372. The ECG server 300 further includes a preference information storage unit 374, a program identification information acquiring unit 376, a various-information acquiring unit 378, an ECG information processing unit 380, and a storage unit 382.

The ECG information storage unit 370 stores the ECG information such as scenario information and program information related to a program in association with the program identification information.

The ECG information providing unit 372 can provide scenario information which is related to a program watched by using the receiving terminal 200 and which is configured to be able to be displayed in different display states between the commander 100 and the receiving terminal 200 to the commander 100 and the receiving terminal 200 based on the program identification information provided from the commander 100 and the receiving terminal 200. The ECG information providing unit 372 provides program table information including program information related to a program corresponding to the program identification information and program scheduling information to the commander 100. Furthermore, the ECG information providing unit 372 provides scenario information matched with the preference information of the user to the commander 100 based on the user identification information provided from the commander 100.

The preference information storage unit 374 stores the preference information preset for each user of a commander 100 in association with the user identification information. The program identification information acquiring unit 376 acquires program identification information provided from the commander 100 and the receiving terminal 200. Various-information acquiring unit 378 acquires various pieces of information such as the user identification information and the preference information from the commander 100. The ECG information processing unit 380 extracts an ECG scenario based on, for example, the program identification information and performs a process related to the ECG information such that a filtering process of the ECG scenario or the like is performed based on the preference information. The storage unit 382 stores the pre-registered user identification information, the preference information, and the like.

(Configuration of ECG Scenario)

Figure 5:
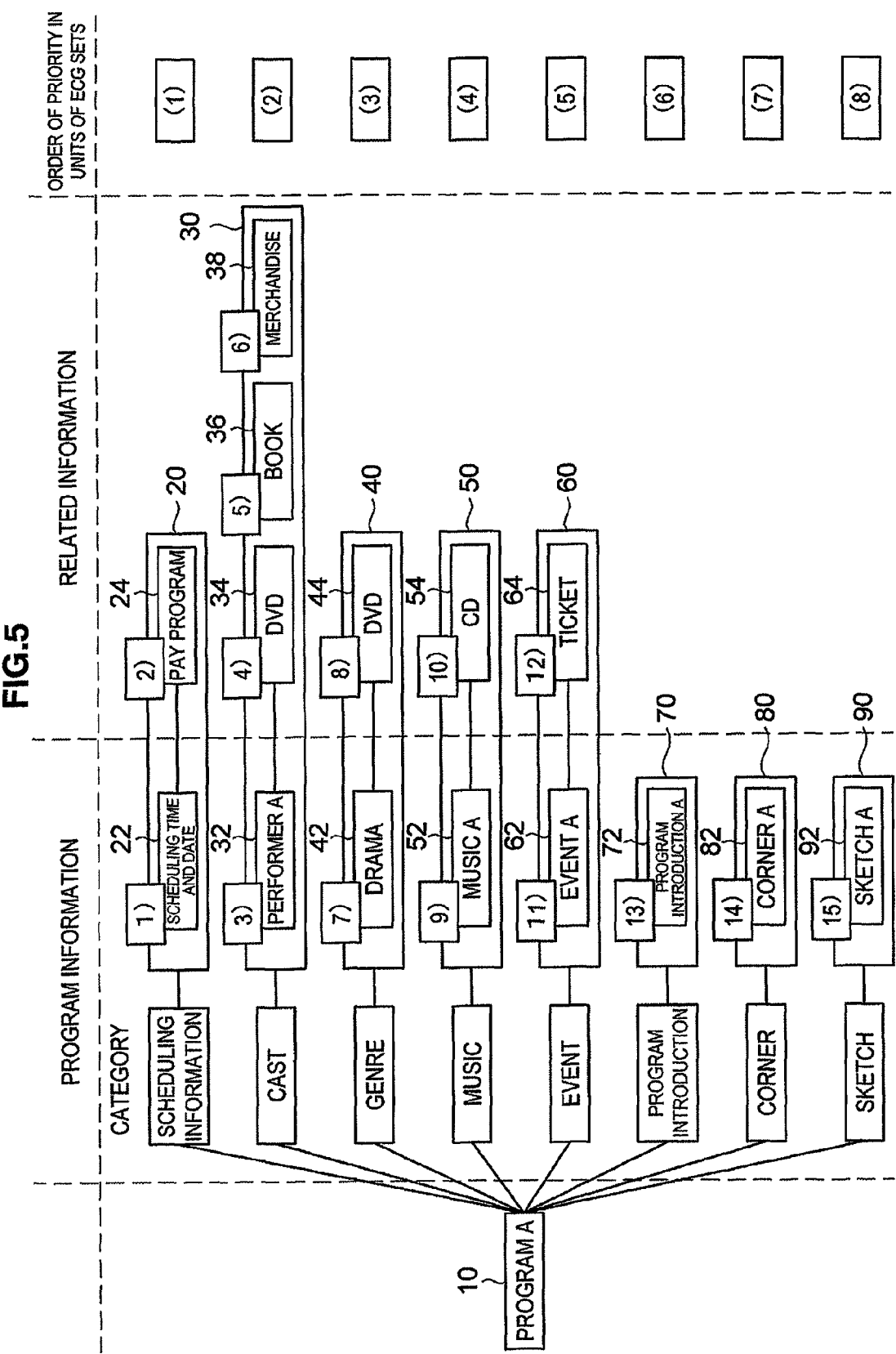
FIG. 5 is an explanatory diagram illustrating a configuration of ECG data included in the ECG scenario.

FIG. 5 is an explanatory diagram illustrating a configuration of ECG data included in the ECG scenario. As shown in FIG. 5, the ECG scenario includes the program information, the related information, and associating information which associates the program, the program information, and the related information with each other. The ECG scenario is configured by bundling ECG sets constituted by the program information and/or the related information.

The ECG scenario illustrated in FIG. 5 includes, as program information associated with a "program A" 10, "scheduling date and time" 22, a "performer A" 32, a "drama" 42, a "music A" 52, an "event A" 62, a "program introduction A" 72, a "corner A" 82, and a "sketch A" 92. The pieces of program information are arbitrarily classified in categories of scheduling information, a cast, a genre, music, an event, program introduction, a corner, and a sketch. For example, as the program information, for example, related information "DVD" 34, a "book" 36, and "merchandise" 38 are associated with program information "performer A" 32 to configure one ECG set 30. All or some of ECG sets 20 to 90 corresponding to the pieces of program information are bundled to configure an ECG scenario.

Orders of priority may be given to the ECG sets, the pieces of program information, and/or the related information constituting the ECG scenario as described below. In this case, orders of priority "(1)" to "(8)" are given to the ECG sets 20 to 90, and orders of priority "3)" to "6)" are given to, for example, the program information 32 and the pieces of related information 34, 36, and 38, respectively. In this manner, in execution of the ECG scenario, subsequent to a display of the "program information A" 32, the pieces of related information 34, 36, and 38 related to the program information 32 are sequentially displayed. Thereafter, the program information 42 with the order of priority "7)" is displayed.

The ECG scenario includes the program information and/or the related information and is associated with detailed information related to the program information and/or detailed information related to the related information. The detailed information related to the program information includes, for example, detailed information related to scheduling and casts of programs, detailed information related to music, an event, and the like related to the programs. The detailed information related to the related information includes detailed information of advertisement, and information related to purchase and payment procedures, information related to recording and watching programming of a program.

In a display state of the corresponding program information, when a request operation by a user, the detailed information related to the program information is provided from the ECG server 300 to the commander 100 or the receiving terminal 200. In a display state of the corresponding related information, when a request operation is performed by the user, the detailed information related to the related information is provided from the sponsor 500 to the commander 100 or the receiving terminal 200 through the ECG server 300. The detailed information related to the related information includes, for example, information necessary for processes such as purchase and payment procedures, questionnaire, and recording and watching scheduling. Based on the information, a predetermined process is performed among the user and the sponsor 500 through the commander 100 or the receiving terminal 200.

(Meta Data of ECG Scenario)

FIGS. 6A, 6B, and 6C and FIGS. 7A and 7B are explanatory diagrams illustrating meta data constituting an ECG scenario. In each of FIGS. 6A, 6B, and 6C and FIGS. 7A and 7B, meta data related to a program, a related information, an ECG scenario, and the ECG scenario are illustrated.

Meta data related to a program shown in FIG. 6A describes a program and information to associate the program with an ECG scenario related to the program. In the meta data, an ID "P00001" of a program, a name "style of professional", a reference ID (relation_ref) "sc00001" of the ECG scenario, providing start date and time "2007/7/10 22:00:00" of the program, providing end date and time "2007/7/10 23:00:00", and the like are described. Attribute information (image information) "p00001.jpg" and "person1.jpg" of the ECG data related to an image file of a program logo and an image file of a performer AAA are described.

The meta data related to the related information shown in FIG. 6B describes information such as a genre and a keyword of the related information and a site to obtain the detailed information. In the meta data, an ID (content id) "C00001" of the related information, a name "merchandise 1", a site to obtain the detailed information (content_info) "www.zony-.co.jp", and the like are described. Attribute information (image information) "c00001.jpg" of the ECG data related to an image file of the merchandise is described.

The meta data related to the ECG scenario shown in FIG. 6C describes information of an ECG set constituting an ECG scenario to which the meta data related to the program shown in FIG. 6A refers. In the meta data, an ID "sc00001" of the ECG scenario, a name "ECG scenario", providing start date and time "2007/7/1 00:00:00", providing end date and time (or an available period) "2007/7/20 00:00:00", and the like are described. It is also described that providing date and time of a program with which the ECG scenario is associated are 22:00 to 23:00 on 2007/7/10. A content ID "ecg_set_cl" and an ECG set ID "es00001" of ECG set 1 constituting the ECG scenario, a content ID "ecg_set_c2" and an ECG set ID "es00002" of ECG set 2 constituting the ECG scenario, and the like are described.

The meta data related to the ECG set shown in FIG. 7A describes program information, related information, and the like constituting the ECG set 1. In the meta data, the ID "es00001", the name "ECG set 1", the providing start date and time "2007/7/1 00:00:00", and the providing end date and time (or an available period) "2007/7/20 00:00:00" are described. Although the details will be described later, attribute information (terminal information) "receiving terminal" and updating information (version information) "1.0" of the ECG set are described. Four ECG data with item IDs (content id) "c11", "c12", "c13", and "c14" constituting the ECG set 1 are described. For example, with respect to the ECG data of the item ID "c11", a data type "program (program information)", a program information ID "P011", providing start date and time "2007/7/1 00:00:00", providing end date and time "2007/7/10 22:00:00", and the like are described. On the other hand, with respect to the ECG data of the item ID "c14", a date type "product (merchandise information)", a related information ID (content id) "C011", providing start date and time "2007/7/1 00:00:00", providing end date and time "2007/7/20 00:00:00", and the like are described.

The providing start dates and times and the providing end dates and times of the ECG data with the item IDs "c11", "c12", and "c13" corresponding to the program information are set as a period before the program providing date and time (22:00 to 23:00 on 2007/7/10), a providing period, and a period after the providing date and time, respectively. On the other hand, the providing start date and time and the providing end date and time of the ECG data with the item ID "c14" corresponding to the related information are set periods before and after a period in which the program is provided, respectively, the periods including the period in which the program is provided. For this reason, when the ECG scenario including the ECG set 1, as program information, the ECG data with the item IDs "c11", "c12", and "c13" are displayed in the period before the program providing date and time, the providing time, and the period after the providing date and time, respectively. On the other hand, as the related information, ECG data with the item ID "c14" is displayed in the period before and after the period in which the program is provided, the periods including the program providing period.

The meta data related to the ECG set shown in FIG. 7B describes information such as the program information and the related information constituting the ECG set 2. In the meta data, three ECG data with item IDs "c21", "c22", and "c23" constituting the ECG set 2 are described. Attribute information (terminal information) "commander" and updating information (version information) "1.0" of the ECG set are described.

(Process Flow of ECG Scenario)

FIG. 8 is a flow chart showing a process flow in execution of the ECG scenario.

Prior to the execution of the ECG scenario, provision of the ECG service is activated through an operation performed by a user of the commander 100 and the receiving terminal 200 (step S10). When the provision of the ECG service is activated, a latest ECG scenario associated with a selected program is acquired from the ECG server 300 (S12). When the ECG scenario is acquired, for example, according to the meta data shown in FIGS. 6A, 6B, and 6C and FIGS. 7A and 7B, the acquired ECG scenario is executed and processed.

When the ECG scenario is executed, the program information, the related information, and the like constituting the ECG scenario are sequentially displayed in units of ECG sets according to the allocated orders of priority (S14). When the display of all the ECG sets constituting the ECG scenario is completed (S18), the display of the ECG scenario is repeated according to the orders of priority again (S20).

When a user finds interested information in the displayed program information or the related information, the user performs a determining operation (S16). When the determining operation is performed, depending on the program information and the related information displayed when the determining operation is performed, a process to display detailed information related to the program information and the related information and to provide various services related to the related information is performed.

In execution of the ECG scenario, when an operation of the commander 100 which is not related to the execution of the ECG scenario or an interrupt event such as updating, changing, and the like of the program table information occurs (S24), the execution of the ECG scenario is ended or temporarily stopped (S26), and the interrupt event is executed (S28).

(Updating Process of Program Information)

Figure 9C:
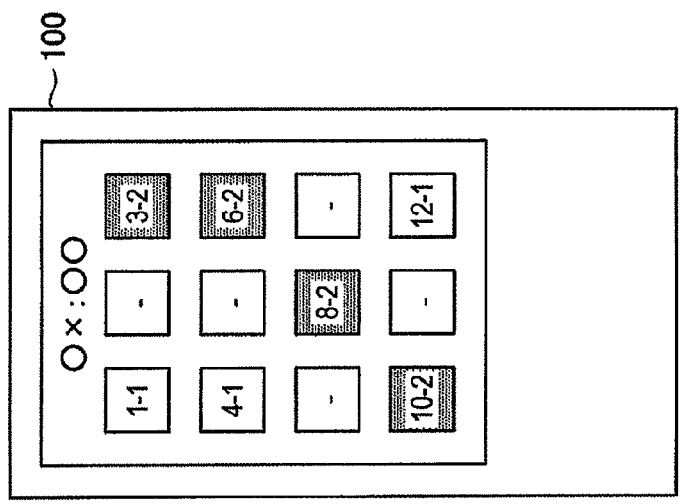
FIG. 9C is a diagram for explaining the display screen before the channel selecting operation process in the command.
Figure 9B:
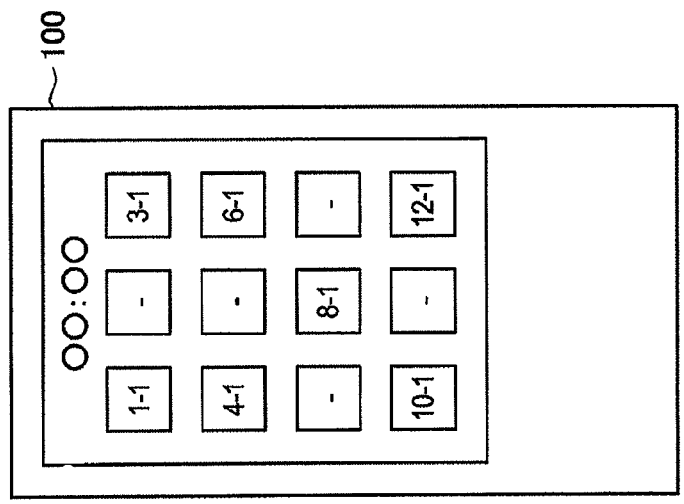
FIG. 9B is a diagram for explaining the display screen before the channel selecting operation process in the command.
Figure 9A:
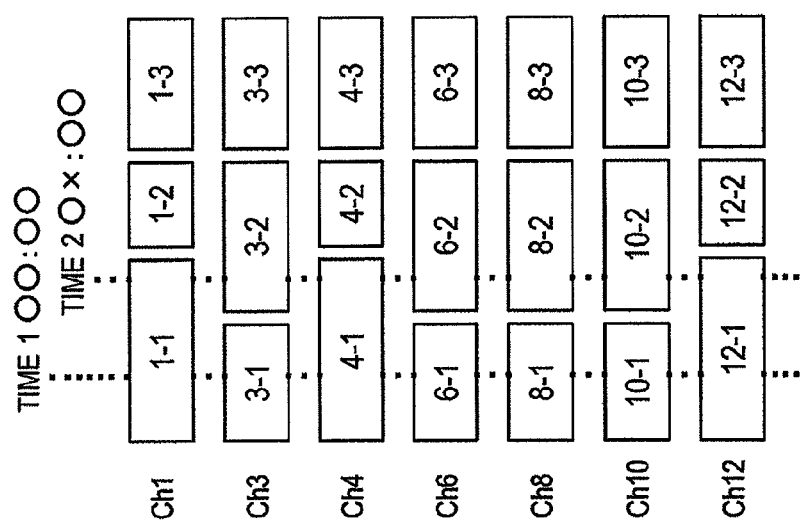
FIG. 9A is a diagram for explaining a display screen before a channel selecting operation process in a commander.

FIGS. 9A, 9B, and 9C are diagrams for explaining a display screen obtained before a channel selecting operation process in the commander 100 is performed. FIG. 9A shows a time chart of programs, and FIGS. 9B and 9C show display screens of the commander 100 corresponding to time 1 "00:00" and time 2 "0x:00" shown in FIG. 9A.

As shown in FIGS. 9B and 9c, in the commander 100, program logos of programs which can be watched at the times (In FIGS. 9B and 9C, a program is expressed as specifiable identification information.) are displayed. As shown in FIG. 9A, in channels (Ch) 1, 3, 4, 6, 8, 10, and 12, programs 1-1, 3-1, 4-1, 6-1, 8-1, 10-1, and 12-1 are provided at time 1. In Ch 3, 6, 8, and 10, new programs 3-2, 6-2, 8-2, and 10-2 are provided at time 2.

For this reason, at time 1, as shown in FIG. 9B, program logos of the programs 1-1, 3-1, 4-1, 6-1, 8-1, 10-1, and 12-1 provided at time 1 are displayed. At time 2, as shown in FIG. 9C, program logos of the programs 3-2, 6-2, 8-2, and 10-2 are updated, the provision of which are started at time 2.

Figure 10:
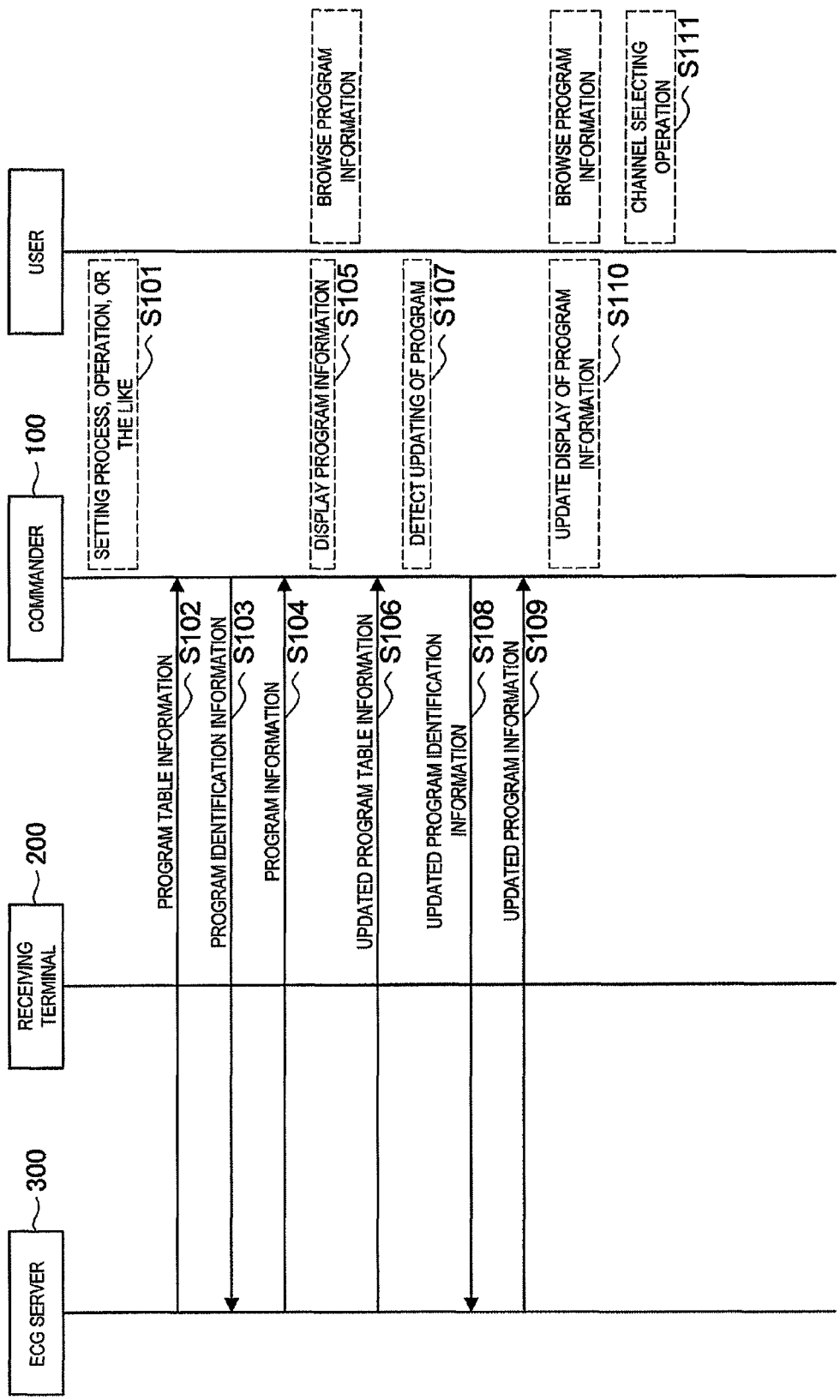
FIG. 10 is a sequential diagram illustrating a method of a program logo updating process shown in FIGS. 9A, 9B, and 9C.

FIG. 10 is a sequence diagram illustrating a method of an updating process of the program logos shown in FIGS. 9A, 9B, and 9C.

As shown in FIG. 10, in the commander 100, after a predetermined setting process, a predetermined setting operation, and the like (step S101) are performed, program table information including scheduling information of programs (for example, program identification information, a type of a program, a providing channel, providing date and time, and the like) is acquired from the ECG server 300 (S102). Based on the program identification information included in the program table information, ECG information (program information) expressing the program logo of the watchable program is acquired from the ECG server 300 to be displayed on the commander 100 (S103 to S105).

In this case, in order to update the program information on real time, in the channel selecting operation process, in a predetermined cycle or when updating of scheduling information is confirmed, the latest program table information is acquired from the ECG server 300 (S106). When the change of the watchable program is detected based on the program table information by passage of time (S107), based on the program identification information, program information expressing the program logo of the changed program is acquired from the ECG server 300, and the display of the corresponding program logo is automatically updated (S108 to S110). When a user selects the program logo to perform a channel selecting operation (S111), screen displays of the commander 100 are switched to display ECG information (ECG scenario) related to a program corresponding to the selected program logo.

In this manner, since the program information expressing the watchable program is updated on real time, the user can select a desired program based on the updated program information and browse the ECG scenario.

In the channel selecting process, when the identification information of the user or the commander 100 is communicated to the ECG server 300, for example, based on the program table information, a change of a watchable program is detected by the ECG server 300, and the program information expressing the program logo of the changed program may be automatically provided from the ECG server 300 to the commander 100. In this case, the latest program table information need not be acquired by the commander 100. In place of provision of the program identification information to specify the changed program to the ECG server 300, the program information of all programs which can be watched, when updating of the scheduling information is confirmed, may be acquired from the ECG server 300 and updated.

(Display Process 1 of ECG Scenario)

Figure 11B:
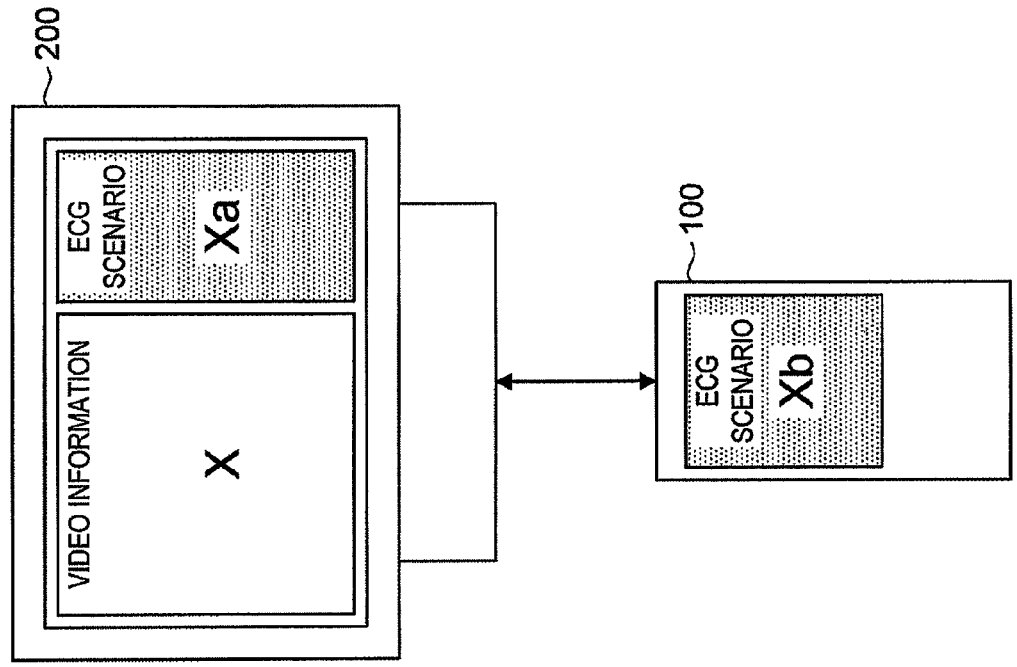
FIG. 11B is an explanatory diagram illustrating a display screen after the channel selecting operation process in the commander.
Figure 11A:
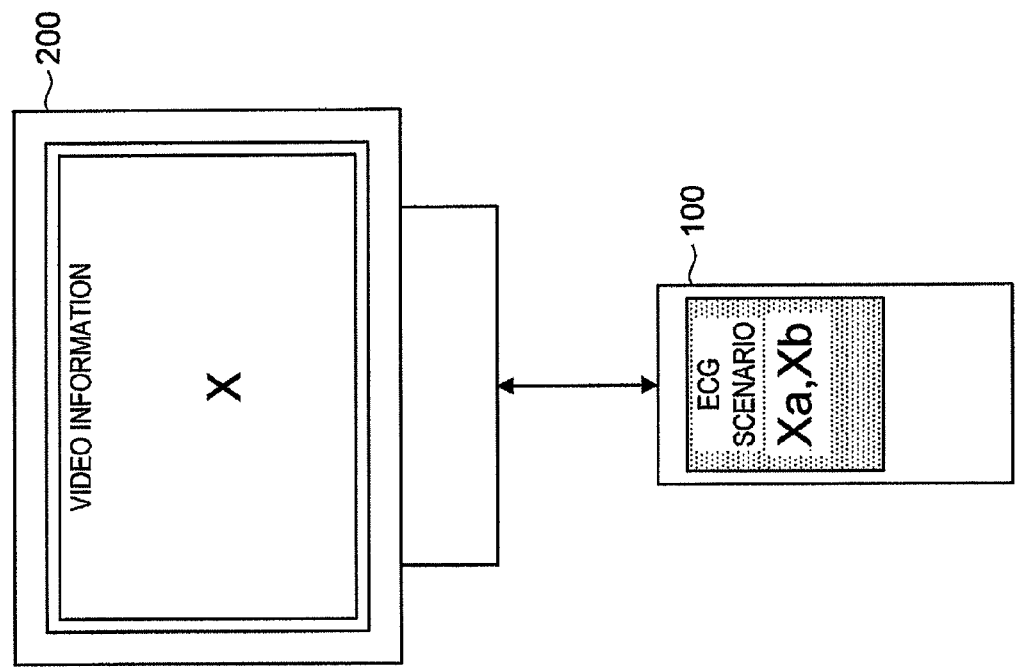
FIG. 11A is an explanatory diagram illustrating a display screen after a channel selecting operation process in a commander.

FIGS. 11A and 11B are explanatory diagrams illustrating display screens obtained after the channel selecting operation process in the commander 100. FIGS. 11A and 11B show a case where display states of the ECG scenario in the commander 100 are changed depending on display states of the ECG scenario in the receiving terminal 200.

In the example shown in FIG. 11A, only video information X of a program is displayed on the receiving terminal 200, and ECG scenarios Xa and Xb are displayed on the commander 100. In the example shown in FIG. 11B, video information X and the ECG scenario Xa are displayed on the receiving terminal 200, and the ECG scenario Xb different from the ECG scenario Xa is displayed on the commander 100.

In the screen display, for example, setting information to change screen displays depending on types (for example, a sport program, a drama, or the like) of a program to be watched is registered in the commander 100 and the receiving terminal 200 in advance. When a program of a type corresponding to the setting information is detected, the screen display is realized by performing a changing process of the screen display. The setting information on the receiving terminal 200 is registered in the commander 100 together with the setting information on the commander 100, and the setting information may be provided to the receiving terminal 200 as needed. The setting information on the commander 100 may not be registered in each commander 100 in advance, and may be registered for each of the users of the commanders 100 like preference information (will be described later).

In particular, when the display of the ECG scenario is stopped on the receiving terminal 200, the pieces of setting information on the commander 100 side and the receiving terminal 200 side may be registered such that the ECG scenario Xa and the ECG scenario Xb the displays of which are stopped on the receiving terminal 200 are simultaneously or sequentially displayed. When the ECG scenario is displayed on the commander 100 and the receiving terminal 200, the pieces of setting information on the commander 100 side and the receiving terminal 200 side may be registered such that the ECG scenario Xa is displayed on the receiving terminal 200 and the ECG scenario Xb is displayed on the commander 100.

In addition to the pre-registration of the setting information, control information to perform a changing process of screen displays may be provided to the commander 100 and the receiving terminal 200 by a control operation of a user. In particular, when the display of the ECG scenario Xa is stopped on the receiving terminal 200, a signal representing the effect is provided from the commander 100 to the receiving terminal 200, and the commander 100 may be controlled such that the displays of the ECG scenario Xa the displays of which is stopped on the receiving terminal 200 and the ECG scenario Xb are performed. When the ECG scenario is displayed on the commander 100 and the receiving terminal 200, a control signal representing the ECG scenario Xa is provided from the commander 100 to the receiving terminal 200, the commander 100 may be controlled to display the ECG scenario Xb. In this manner, in the commander 100, display states of the ECG scenario can be changed depending on display states of the ECG scenarios on the receiving terminal 200.

In this case, as an example of a combination of the ECG scenarios Xa and Xb, for example, a combination of schematic information and detailed information related to a program, a combination of present information related to a program and past or future information (for example, an intermediate step of a sport competition, a sketch of a drama, an advance notice, or the like), and the like are given.

FIG. 12 is a sequence diagram illustrating a method of a changing process of screen displays shown in FIGS. 11A and 11B. In FIG. 12, processes in steps S128 to S134 and processes in steps S135 to S138 are sequentially shown. However, both the processes in both the sequences may be executed in parallel with each other or may be executed in reverse order.

As shown in FIG. 12, in the commander 100, a registering process which registers user identification information in the receiving terminal 200 and the ECG server 300 is performed in advance (S121 and S122). The user identification information mentioned here is information which can specify a user between the commander 100, the receiving terminal 200, and the ECG server 300. In connection with the user identification information, various pieces of information (for example, addresses, contact information, and the like) of users may be stored in the commander 100. In this manner, when various processes such as purchase and payment procedures are performed through the ECG server 300, the stored various pieces of information of the users can be read and used.

In the commander 100 and the receiving terminal 200, a registering process which registers setting information is also performed in advance (S123 to S125). In the commander 100, as shown in FIGS. 9A, 9B, 9C, and 10, when a channel selecting operation is performed, program identification information to specify a program to be watched and user identification information are provided to the receiving terminal 200 and the ECG server 300 (S126 and S127). In this case, the program identification information may be identification information such as a program code allocated to a program to be watched, information of a providing channel, or information of a providing medium as needed. When the information of the providing channel and, as needed, the information of the providing medium, are provided as the program identification information, an arbitrary program can be specified based on scheduling information of programs included in, for example, the program table information or the like.

With respect to the receiving terminal 200, the acquired user identification information is compared with user registration information registered in the receiving terminal 200 in advance. When the user identification information corresponds to any one of the user registration information, the channel selecting process is performed on the acquired program identification information (S128 to S130). In this manner, specific program identification information is shared by the commander 100 and the receiving terminal 200, and a watching channel is linked. The acquired program identification information is provided to the ECG server 300, and the ECG scenario related to the program corresponding to the program identification information is acquired from the ECG server 300 (S131 and S132).

On the other hand, with respect to the commander 100, the user identification information acquired in the ECG server 300 is compared with user registration information registered in the ECG server 300 in advance. When the user identification information corresponds to any one of the user registration information, an ECG scenario related to a program corresponding to the program identification information is extracted and provided (S135 and S136). In this manner, the ECG scenario related to the common program can be displayed between the commander 100 and the receiving terminal 200.

In this case, the ECG scenario acquired in the receiving terminal 200 is displayed in synchronism with the progress of the program based on scheduling information of the program and the present time. When a watching channel is linked, even in the commander 100, similarly, the acquired ECG scenario is displayed in synchronism with the progress of the program.

In the commander 100 and the receiving terminal 200, when, based on pre-registered setting information, watching of a program of a type corresponding to the setting information is detected, the changing process of a screen display is performed (S133 and S137). In this case, the type of the program is determined based on the scheduling information of the program included in, for example, the program table information or the like and/or the program identification information. In order to cope with a change of screen displays, for example, pieces of attribute information representing schematic information, detailed information, information for a commander, information for a receiving terminal, and the like are given in units of ECG scenarios or ECG sets, pieces of program information, pieces of related information, and the like. For example, FIGS. 7A and 7B show a case where pieces of attribute information (terminal information) representing the information for the receiving terminal and the information for the commander are given to the ECG sets constituting the ECG scenario.

For example, when a setting representing that the ECG scenario is not displayed on the receiving terminal 200 is made, as shown in FIG. 11A, in place of a display of the ECG scenario Xa (information for the receiving terminal) on the receiving terminal 200, the ECG scenario Xa is displayed on the commander 100 together with the ECG scenario Xb (S134 and S138). When a setting representing that the ECG scenario Xa (schematic information) is not displayed on the receiving terminal 200 and that the ECG scenario Xb (detailed information) is displayed on the commander 100, pieces of information corresponding to the setting information of the ECG scenario acquired by the commander 100 and the receiving terminal 200 are displayed (S134 and S138). When watching of the program of the corresponding type is detected, for example, a screen display set as a default state may be performed such that the ECG scenarios Xa and Xb are displayed on the commander 100 and the receiving terminal 200, respectively.

In this case, when a watching channel is linked between the commander 100 and the receiving terminal 200, as in the updating process of the program logo, when a change of programs on a channel being selected based on the program table information is detected with passage of time, the ECG scenario related to the changed program is acquired from the ECG server 300, and the screen display is automatically updated.

The case where the ECG scenario corresponding to the setting information is determined by the commander 100 or the receiving terminal 200 is described above. However, the setting information is provided to the ECG server 300, and the corresponding ECG scenario and the information included in the ECG scenario may be subjected to a filtering process on the ECG server 300 side, reconfigured as needed, and provided to the commander 100 and the receiving terminal 200. In place of the change of display states on the commander 100 depending on display states on the receiving terminal 200, the display states on the receiving terminal 200 may be changed depending on the display states on the commander 100.

FIG. 13 is a sequence diagram illustrating another method of linking a watching channel. In the above-mentioned linking method, for example, by using IrDA or the like, one-way communication is performed from the commander 100 to the receiving terminal 200. However, in the other linking method shown in FIG. 13, it is assumed that, for example, by using Bluetooth (registered trademark), two-way communication can be performed between the commander 100 and the receiving terminal 200.

In another method, for example, by an operation or the like of a link operation button by a user, link operation information is provided from the commander 100 to the receiving terminal 200, and program identification information to specify a watched program is provided from the receiving terminal 200 to the commander 100 (S143 to S145). In this manner, without performing a channel selecting operation, a watching channel can be linked between the commander 100 and the receiving terminal 200. In the commander 100, the acquired program identification information and the user identification information are provided to the ECG server 300. After a user identifying process, the ECG scenario related to a program corresponding to the program identification information is acquired from the ECG server 300 (S150 to S152). When the user identifying process is performed in advance, only the acquired program identification information may be provided to the ECG server 300.

In still another linking method, in place of the operation of the link operation button, for example, by using the function of Bluetooth, when a specific commander comes in a range in which another Bluetooth terminal can be searched for by the receiving terminal 200 or another commander, a specific commander may be automatically recognized, and the program identification information to specify a watched program may be provided from the receiving terminal 200 or the other commander to the specific commander (S146 to S149). In this manner, without performing a channel selecting operation, a watching channel can be linked between the commander 100 and the receiving terminal 200.

As an issue in the past, for example, when a program is watched by a plurality of viewers, a certain viewer may desire to watch only video information, and another viewer may desire to browse an ECG scenario. In this case, when video information and the ECG scenario are displayed on the receiving terminal 200, the video information is prevented from being watched when the ECG scenario is displayed, and the ECG scenario is difficult to be browsed when the ECG scenario is not displayed. Even though a program is watched by a single viewer, depending on, for example, the type or the like of the program, the viewer may feel bothered by performing changing operations of screen displays to temporarily stop the display of the ECG scenario and to restart the display.

In the commander 100 according to the embodiment, as shown in FIG. 11A, the screen display is controlled to display only the video information X on the receiving terminal 200 and to display the ECG scenarios Xa and Xb on the commander 100. For this reason, the issue in the past can be solved. As shown in FIG. 11B, when the screen display is controlled to display the different ECG scenarios Xa and Xb on the commander 100 and the receiving terminal 200, respectively, for example, different pieces of information such as schematic information and detailed information related to the program can be efficiently browsed.

The case where setting information to change display screens depending on types of programs to be watched is registered in the commander 100 and the receiving terminal 200 in advance is described above. In this case, the change of the screen displays is controlled on the acquiring side of the ECG scenario, i.e., user sides of the commander 100 and the receiving terminal 200. However, the change of the screen displays, as will be described below, can also be controlled on a providing side of the ECG scenario, i.e., an information service provider side using the ECG server 300.

When the change of the screen displays is controlled on the providing side of the ECG scenario, for example, setting information (attribute information) representing that the change is controlled by the providing side is given to an ECG scenario (or information included in the ECG scenario) desired to be preferentially provided in advance, so that the screen displays can be changed depending on link states of a watching channel.

When a screen display as shown in FIG. 11A is performed, for example, setting information representing a relatively high priority is given to the ECG scenario Xa (or information included in the Xa) in advance, and setting information representing a relatively low priority is given to the ECG scenario Xb (information included in the Xb) in advance. The ECG scenarios Xa and Xb are provided from the ECG server 300 to the commander 100 and/or the receiving terminal 200.

When a watching channel is linked, i.e., the ECG scenario can be browsed on both the commander 100 and the receiving terminal 200, for example, the ECG scenario Xa is displayed on the commander 100, and the ECG scenario Xb is displayed on the receiving terminal 200. In this case, the display of the ECG scenario is stopped on the receiving terminal 200, screen displays are changed, and, based on the setting information, in place of the stoppage of the display of the ECG scenario Xa on the receiving terminal 200, the ECG scenario Xa is preferentially displayed on the commander 100 together with the ECG scenario Xb. In this manner, a viewer can watch only the video information X on the receiving terminal 200 and efficiently browse the ECG scenarios Xa and Xb on the commander 100. When the watching channel is not linked, i.e., when the ECG scenario can be browsed on only any one of the commander 100 and the receiving terminal 200, the ECG scenario Xa may be preferentially displayed on an apparatus, on which the ECG scenario can be browsed, based on the setting information together with the ECG scenario Xb.

With a display configuration as described in FIG. 11B, the ECG scenario Xa (or information included in the Xa) serving as image information can also be displayed on the receiving terminal 200, and the ECG scenario Xb (or information included in the Xb) serving as textual information can also be displayed on the commander 100. In this case, for example, setting information (for example, image information shown in FIGS. 6A and 6B) representing image information is given to the ECG scenario Xa (or information included in the Xa) in advance. Without giving the setting information, a type of information may be determined on an acquiring side of the ECG scenario by a source format of the information included in the ECG scenario. The ECG scenarios Xa and Xb are provided from the ECG server 300 to the commander 100 and/or the receiving terminal 200.

When the watching channel is linked, based on the setting information or the source format, the ECG scenario Xa is displayed on the receiving terminal 200, and the ECG scenario Xb is displayed on the commander 100. In this manner, a viewer can browse the image information on the receiving terminal 200 and efficiently browse the textual information on the commander 100. When the watching channel is not linked, the ECG scenarios Xa and Xb may be simultaneously or sequentially displayed on the commander 100 and/or the receiving terminal 200.

(Display Process 2 of ECG Scenario)

Figure 14B:
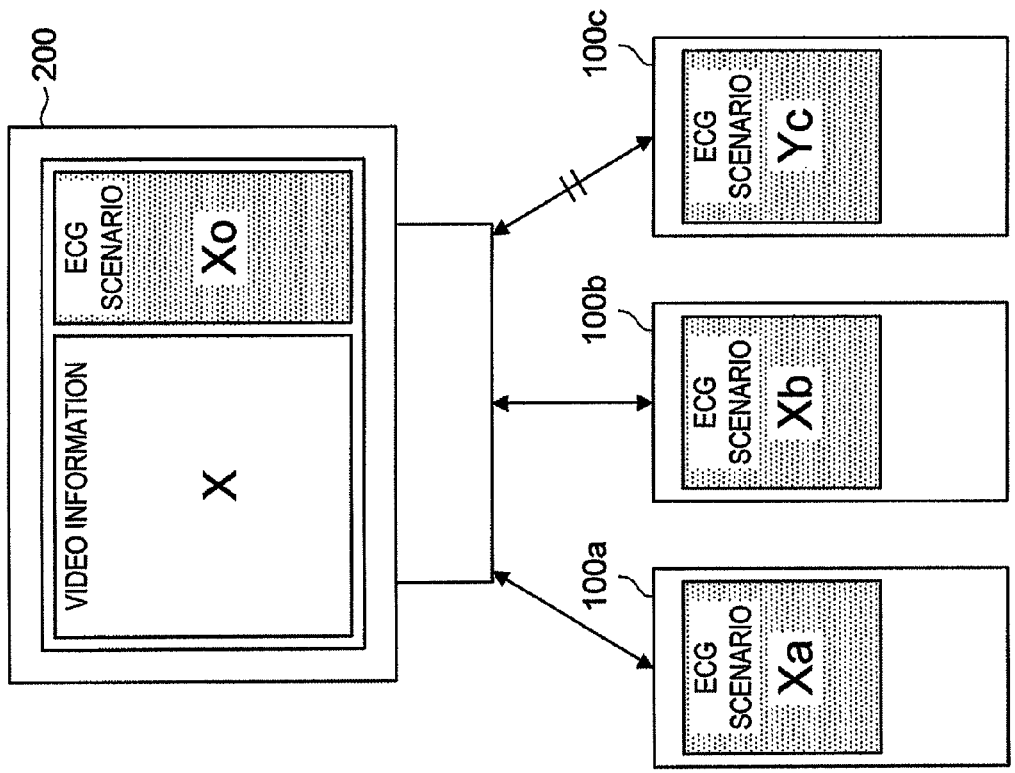
FIG. 14B is an explanatory diagram illustrating a display screen after the channel selecting operation process in the commander.
Figure 14A:
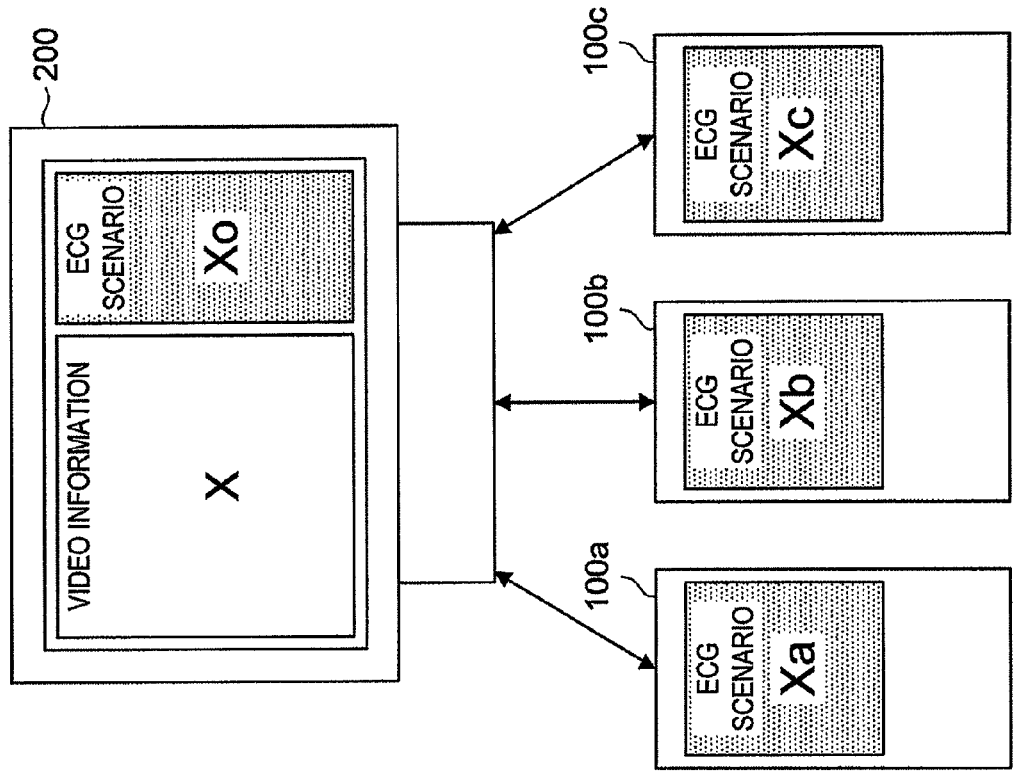
FIG. 14A is an explanatory diagram illustrating a display screen after a channel selecting operation process in a commander.

FIGS. 14A and 14B are explanatory diagrams illustrating a display screen obtained after a channel selecting operation process on the commander 100. FIGS. 14A and 14B show cases in which ECG scenarios matched with the preferences of users of the commanders 100 are displayed.

In the example shown in FIG. 14A, when a watching channel is liked, based on pieces of preference information a, b, and c of users using commanders 100a, 100b, and 100c, different ECG scenarios Xa, Xb, and Xc are displayed on the plurality of commanders 100a, 100b, and 100c, respectively. In the example shown in FIG. 14B, based on the pieces of preference information a, b, and c of the commanders 100a, 100b, and 100c, different ECG scenarios Xa, Xb, and Yc are displayed on the plurality of commanders 100a, 100b, and 100c, respectively. In the receiving terminal 200, although an ECG scenario Xo is displayed on the receiving terminal 200, an ECG scenario except for the ECG scenario Xo may be displayed. In addition, the ECG scenario may not be displayed.

The screen display described above is realized such that, for example, preference information for each user is registered in the ECG server 300 in advance, and the ECG scenario is subjected to a filtering process on the ECG server 300 side and provided. Even though the preference information of each user is not registered in advance, control information to perform the filtering process may be provided to the ECG server 300 by a control operation of the user as needed.

In the example shown in FIG. 14A, when the watching channel is linked, on the commanders 100a, 100b, and 100c, the ECG scenarios Xa, Xb, and Xc which are ECG scenarios related to a program being watched and are matched with the pieces of preference information a, b, and c are displayed.

In the example shown in FIG. 14B, on the commanders 100a and 100b, the ECG scenarios Xa and Xb which are ECG scenarios related to a program being watched and are matched with the pieces of preference information a and b are displayed. On the other hand, on the commander 100c, when the watching channel is not liked, the ECG scenario Yc is an ECG scenario related to a program except for the program being watched and is matched with the preference information c is displayed. A program Y may be a program which is provided in the past or a program which will be provided in the future regardless of a program on a channel different from the channel of the program being watched as will be described later.

As an example of the preference information, for example, pieces of information such as program information, sales information, advertising information classified by categories of the ECG scenarios or pieces of information such as a cast, a genre, music, and an event classified by categories of program information may be used.

FIG. 15 is a sequence diagram illustrating a method of a changing process of screen displays shown in FIGS. 14A and 14B. Even in FIG. 15, as in the case shown in FIG. 12, the processes in steps S165 to S170 and the processes in steps S171 to S174 are sequentially shown. However, both the processes in both the sequences may be executed in parallel with each other or may be executed in reverse order.

As shown in FIG. 15, in the commander 100, a registering process which registers user identification information in the ECG server 300 is performed (S161 and S162). When a channel selecting operation for a program is performed, program identification information and user identification information to specify a program to be watched are provided to the receiving terminal 200 and the ECG server 300 (S163 and S164).

With respect to the receiving terminal 200, as described above, a user identifying process is performed when a predetermined condition is satisfied, a channel selecting process is performed based on the acquired program identification information, and a watching channel is linked between the receiving terminal 200 and the commander 100 (S165 to S167). The acquired program identification information is provided to the ECG server 300, and the ECG scenario related to a program corresponding to the program identification information is acquired from the ECG server 300 (S168 and S169). On the other hand, with respect to the commander 100, in the ECG server 300, as described above, a user identifying process (S171) is performed. When a predetermined condition is satisfied, an ECG scenario related to a program corresponding to the acquired program identification information is extracted.

In this case, with respect to the commander 100, in the ECG server 300, the extracted ECG scenario subjected to a filtering process based on preference information of a user is provided (S172 and S173). The ECG scenario is subjected to the filtering process based on attribute information which is allocated to each of pieces of information included in the ECG scenario and expresses a data type (program, sales, advertisement, or the like) of the ECG set. On the receiving terminal 200, the normal ECG scenario Xo is displayed. On the commander 100, the ECG scenarios Xa, Xb, and Xc matched with the preference information of the user are displayed (S170 and S174). In this case, when the preference information is not set, or when the information matched with the preference information can be hardly obtained by the filtering process, a display set as a default state is performed.

When watching is performed without performing a channel selecting operation, in the commander 100, after the program identification information is acquired by the link operation, automatic recognition, or the like shown in FIG. 13, the acquired program identification information and the user identification information are provided to the ECG server 300. In the ECG server 300, the ECG scenario related to the program corresponding to the program identification information is extracted after the user identifying process. After the ECG scenario is extracted, the ECG scenario subjected to the filtering process based on the preference information of the user is provided to the commander 100.

The changing process may be combined with the changing process of screen displays shown in FIGS. 11A and 11B in which the display states on the commander 100 are changed depending on display states of the ECG scenario on the receiving terminal 200. In this case, in place of the ECG scenario Xb shown in FIG. 11B, the ECG scenarios Xa, Xb, and Xc or the like are displayed on the commanders 100*a*, 100*b*, and 100*c*.

When a watching channel is linked between the commander 100 and the receiving terminal 200, as in the case shown in FIGS. 11A and 11B, an updating process of the ECG scenario is performed with passage of time. As the filtering process of the ECG scenario, in addition to the method shown in FIG. 15, for example, preference information for each user is stored in the commander 100, and, based on the stored preference information, a filtering process may be performed to the ECG scenario acquired from the ECG server 300.

As an issue in the past, when an ECG scenario inherent in a program is displayed on the receiving terminal 200 regardless of the preference of a viewer, specific viewers may feel bothered by a display of an ECG scenario which is not matched with their own preference.

However, in the commander 100 according to the embodiment, as shown in FIG. 14, since a screen display is controlled such that an ECG scenario matched with the preference of the user can be displayed based on preference information for each user, the issue in the past can be solved. In this manner, based on preference information of a user such as information matched with a preference related to a cast, information matched with a preference pattern for each age group, and information matched with a hobby, information related to a program or merchandise can be provided. As shown in FIG. 14B, for example, when link states of a watching channel are switched by an operation or the like of a link operation button, an ECG scenario related to a program except for the program being watched can be browsed.

Even though the preference information of each user is not registered in the ECG server 300 in advance, preference information of the user can be automatically acquired based on information related to a watched program and/or information related to a browsed ECG scenario. In this case, the acquired preference information is accumulated in at least any one of the commander 100 and the receiving terminal 200.

For example, when a program has been watched for a predetermined period of time set in advance, pieces of main information such as a cast, a genre, music, an event, and the like of a program are extracted from ECG information related to the watched program. In browsing of the ECG scenario, when a user operation to select specific information is detected, for example, pieces of main information such as program information, sales information, and advertising information are extracted from ECG information related to selected specific information. A result obtained by analyzing a frequency of each of the pieces of main information is automatically acquired as the preference information of a user.

By using the preference information of the user, for example, information related to a program matched with the preference of the user is selected from the program table information, and can be provided as information related to a recommended program. In this case, when a watching channel is linked, the information related to the recommended program is displayed on the commander 100, the program table information is displayed on the receiving terminal 200, and the displays on the commander 100 and the receiving terminal 200 may be incorporated with each other. More specifically, identification information representing a program corresponding to the recommended program is added to the program table information, and detailed program information related to the program corresponding to the selected recommended program may be displayed on the receiving terminal 200 in conjunction with a selecting operation of the recommended program by the commander 100.

(Other Process)

In the cases shown in FIGS. 11A and 11B and FIGS. 14A and 14B, in the commander 100, information related to acquired ECG scenario may be stored. For example, when a watching channel is linked, when a specific program has been watched for a predetermined period of time (for example, 3 minutes or the like) set in advance, with respect to the watched program, program identification information, identification information (reference ID or the like of the ECG scenario) of the acquired ECG scenario, the acquired ECG scenario, and the like are stored. In this case, the program identification information may be identification information such as a program code allocated to the watched program, information of a providing channel and providing date and time, or information of a providing medium as needed. Even though the watching channel is not linked, the identification information of the acquired ECG scenario, the acquired ECG scenario, and the like are stored.

The information of the acquired ECG scenario may be stored in not only the commander 100 but also the ECG server 300. In this case, identification information (linking information) which can specify the information stored in the ECG server 300 is stored in the commander 100. Based on the stored linking information, information stored in the ECG server 300 for each commander 100 or each user may be appropriately read.

When a user can communicate with the ECG server 300 by using the commander 100, the user can acquire the corresponding ECG scenario from the ECG server 300 and can browse the ECG scenario based on the stored identification information of the ECG scenario. Based on the stored program identification information, another ECG scenario related to a program specified by the program identification information can be acquired from the ECG server 300 and browsed. On the other hand, even though the user does not communicate with the ECG server 300 by using the commander 100, the user can read and browse the stored ECG scenario. In the commander 100, the preference of the user is analyzed based on the accumulated program identification information, and, based on the program table information, the user is notified of starting provision of a program matched with the preference of the user.

The user can communicate the information stored in the commander 100 between the receiving terminal 200, another commander, or another video display apparatus having an ECG information processing function. For example, the stored ECG scenario may be provided to the receiving terminal 200 or another video display apparatus (for example, another receiving terminal, a PVR, a PC, a car navigation system, a mobile telephone, or the like) and displayed on a display screen of the receiving terminal 200 or the other video display apparatus. In this manner, the ECG information can be browsed on an external device except for the commander 100.

When, another commander stores an ECG scenario newer than the ECG scenario stored in the commander 100 of a user, the newer ECG scenario is acquired from the other commander, and the ECG scenario stored in the commander 100 of the user may be updated by the acquired ECG scenario. For example, FIGS. 7A and 7B show a case where updating information (version information) is given to an ECG set constituting an ECG scenario. When an ECG scenario older than the ECG scenario stored in the commander 100 of the user is stored in another commander, a new ECG scenario may be provided to the other commander.

In the commander 100, not only a program provided at the present and including a program being watched by using the receiving terminal 200, but also ECG scenarios related to a program which is provided in the past or a program which will be provided in the future are acquired and displayed.

For example, on the display screen shown in FIG. 9B, a program logo of a program provided o r a program to be provided at specific date and time designated by a user is displayed. When the program logo selecting operation is performed, the program identification information to specify a program corresponding to the selected program logo and the user identification information are provided to the ECG server 300. In this case, the program identification information may be identification information such as a program code allocated to a corresponding program, information of a providing channel and providing date and time, or information of a providing medium as needed. In the ECG server 300, as described above, the user identifying process is performed. When a predetermined condition is satisfied, an ECG scenario related to a program corresponding to the acquired program identification information is extracted and provided to the commander 100. In the commander 100, the acquired ECG scenario is displayed. Also in this case, screen displays can be changed based on the setting information, the preference information, or the like.

An ECG scenario provided to the commander 100 or an ECG scenario displayed by the commander 100 may be arbitrarily changed depending on scheduling information of programs as shown in FIGS. 7A and 7B. In this case, the ECG scenario related to the program is configured such that the ECG scenario can be provided or displayed as different pieces of information during provision of the program, before the program is provided, and after the program is provided. For example, during the provision of the program, the ECG scenario can be provided or displayed as information displayed in conjunction with the progress of the program. Before the program is provided, the ECG scenario can be provided or displayed as information which previously notices the contents of the program. After the program is provided, the ECG scenario can be provided or displayed as information which previously notices the contents of a program for the next time. In place of the ECG scenario related to the selected program, another program provided on a channel which provides the selected program, for example, an ECG scenario related to a program which can be soon to be watched may be provided or displayed.

In the commander 100, identification information of the displayed ECG scenario and the ECG scenario may be stored. Furthermore, when an ECG scenario of a program which will be provided in the future is displayed, a programming operation process to select watching programming or recording programming of the program may be performed. In this case, scheduling information (for example, program identification information, a type of the program, a providing channel, providing date and time, and the like) and programming operation information are stored in the commander 100, and the stored information is read later and provided to the receiving terminal 200, another video display apparatus, another information recording apparatus, or the like. In this manner, a user can efficiently perform a programming operation process by using the scheduling information of the program.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A remote control terminal which can communicate with an information providing apparatus which provides electronic content guide information related to a program and an information acquiring apparatus which acquires and displays video information of the program and the electronic content guide information, and which can remote-control the information acquiring apparatus, comprising:
    a program identification information acquiring unit which acquires program identification information to designate a program watched by using the information acquiring apparatus;
    a channel selection control unit which remote-controls a channel selecting process by the information acquiring apparatus based on the acquired program identification information;
    a scenario information acquiring unit which acquires scenario information included in the electronic content guide information related a program to be watched based on the acquired program identification information;
    a display unit which displays the scenario information related to the program to be watched; and
    a display control unit which controls the display unit such that a display state of the scenario information related to the program to be watched is changed depending on a display state of the scenario information in the information acquiring apparatus based on predetermined setting information or predetermined operation information,
    wherein when a display of the scenario information is stopped in the information acquiring apparatus, the display control unit controls the display unit to display the scenario information the display of which is stopped,
    wherein when the program to be watched is liked by each of a plurality of users based on preset user preferences associated with a respective display control unit, then the respective display control unit displays scenario information related to the program to be watched and matched with the respective user's, and
    wherein when the program to be watched is not liked by a particular one of the plurality of users based on the particular user's preferences associated with the particular user's display control unit, then the particular user's display control unit displays scenario information related to a different program from the program to be watched.

2. The remote control terminal according to claim 1, wherein
    when the scenario information is displayed by the information acquiring apparatus, the display control unit controls the display unit to display scenario information different from the scenario information displayed by the information acquiring apparatus.

3. The remote control terminal according to claim 1, wherein
    the display control unit controls the display unit to display scenario information matched with preference information preset for each user.

4. The remote control terminal according to claim 1, further comprising
    a program identification information communication unit which communicates program identification information to specify the watched program to at least any one of the information acquiring apparatus and another remote control terminal.

5. The remote control terminal according to claim 1, further comprising
a program information acquiring unit which acquires program information included in an electronic content guide information and expressing a watchable program, and wherein
the program identification information acquiring unit acquires program identification information to specify a program corresponding to designated program information of the pieces of acquired program information, and
the display control unit controls the display unit to update a display of the program information changed with passage of time on real time.

6. The remote control terminal according to claim 1, further comprising
a history information storage unit which stores at least any one of program identification information to specify a program watched for a predetermined period of time or more, identification information of scenario information acquired with respect to the watched program, and the scenario information, and wherein
the display control unit controls the display unit to display at least any one of the scenario information acquired from the information providing apparatus based on the stored program identification information or the identification information of the scenario information and the stored scenario information.

7. The remote control terminal according to claim 1, wherein
the program information acquiring unit acquires program information expressing at least any one of a program which was provided in the past, a program which is being provided at the present, and a program which will be provided in the future from the information providing apparatus,
the program identification information acquiring unit acquires program identification information to specify a program corresponding to designated program information of pieces of acquired program information,
the scenario information acquiring unit acquires the scenario information related to a program corresponding to the acquired program identification information from the information providing apparatus, and
the display control unit controls the display unit to display the acquired program information and the scenario information.

8. The remote control terminal according to claim 7, further comprising
a history information updating unit which, when the remote control terminal communicates with another remote control terminal and stores updated scenario information newer than its own stored scenario information in the other remote control terminal, updates its own stored scenario information by the new scenario information acquired from the other remote control terminal.

9. The remote control terminal according to claim 7, further comprising
further includes a programming operation process unit which acquires and stores programming operation information to a program which will be provided in the future and provides the stored programming operation information to at least any one of the information acquiring apparatus, another information acquiring apparatus, and information recording apparatus.

10. An information acquiring apparatus which can communicate with an information providing apparatus which provides electronic content guide information related to a program and a remote control terminal which acquires and displays the electronic content guide information and which can remote-control the information acquiring apparatus, and which acquires and displays video information and the electronic content guide information of the program, comprising:
a channel selecting unit which performs a channel selecting operation based on program identification information provided from the remote control terminal;
a video information receiving unit which receives the video information of a program to be watched based on the program identification information;
a scenario information acquiring unit which acquires scenario information included in the electronic content guide information related to the program to be watched based on the program identification information;
a display unit which displays the video information of the program and the scenario information related to the program to be watched; and
a display control unit which can control the display unit to change a display state of the scenario information related to the program to be watched depending on a display state of the scenario information on the remote control terminal based on predetermined setting information or predetermined operation information,
wherein when a display of the scenario information is stopped in the information acquiring apparatus, the display control unit controls the display unit to display the scenario information the display of which is stopped,
wherein when the program to be watched is liked by each of a plurality of users based on preset user preferences associated with a respective display control unit, then the respective display control unit displays scenario information related to the program to be watched and matched with the respective user's, and
wherein when the program to be watched is not liked by a particular one of the plurality of users based on the particular user's preferences associated with the particular user's display control unit, then the particular user's display control unit displays scenario information related to a different program from the program to be watched.

11. An information acquiring apparatus according to claim 10, further comprising
a program identification information providing unit which provides program identification information to specify the watched program to the remote control terminal.

12. An information providing apparatus which can communicate with an information acquiring apparatus which acquires video information and electronic content guide information of a program and a remote control terminal which acquires and displays the electronic content guide information and which can remote-control the information acquiring apparatus, and which provides the electronic content guide information related to the program, comprising:
a scenario information storage unit which stores scenario information included in the electronic content guide information related to a program in association with program identification information; and
a scenario information providing unit which provides, based on the program identification information provided by the information acquiring apparatus and the remote control terminal, scenario information which is related to a program watched by using the information acquiring apparatus and which is configured to be able to be displayed in different display states between the information acquiring apparatus and the remote control terminal to the information acquiring apparatus and the remote control terminal, wherein when a display of the scenario information is stopped in the information acquiring apparatus, a display control unit controls a display unit of the remote control terminal to display the scenario information the display of which is stopped, wherein when the program to be watched is liked by each of a plurality of users based on preset user preferences associated with a respective display control unit, then the respective display control unit displays scenario information related to the program to be watched and matched with the respective user's, and wherein when the program to be watched is not liked by a particular one of the plurality of users based on the particular user's preferences associated with the particular user's display control unit, then the particular user's display control unit displays scenario information related to a different program from the program to be watched.

13. The information providing apparatus according to claim 12, further comprising a preference information storage unit which stores preference information preset for each user of the remote control terminal in association with user identification information, and wherein the scenario information providing unit provides scenario information matched with preference information of the user based on the user identification information provided from the remote control terminal.

14. An information providing system in which an information providing apparatus which provides electronic content guide information related to a program, an information acquiring apparatus which acquires and displays video information and the electronic content guide information of the program, and a remote control terminal which can remote-control the information acquiring apparatus can communicate with each other, wherein the information providing apparatus comprises:

a scenario information storage unit which stores scenario information included in the electronic content guide information related to a program in association with program identification information; and a scenario information providing unit which provides, based on the program identification information provided by the information acquiring apparatus and the remote control terminal, scenario information which is related to a program watched by using the information acquiring apparatus and which is configured to be able to be displayed in different display states between the information acquiring apparatus and the remote control terminal to the information acquiring apparatus and the remote control terminal, the information acquiring apparatus comprises:

a channel selecting unit which performs a channel selecting operation based on the program identification information provided from the remote control terminal;

a video information receiving unit which receives the video information of the program to be watched;

a first scenario information acquiring unit which acquires the scenario information related to the program to be watched from the information providing apparatus based on the program identification information;

a first display unit which displays the video information of the program and the scenario information related to the program to be watched;

a first display control unit which can control the first display unit to change a display state of the scenario information related to the program to be watched depending on a display state of the scenario information on the remote control terminal based on predetermined setting information or predetermined operation information, and the remote control terminal comprises:

a program identification information acquiring unit which acquires the program identification information to designate a program watched by using the information acquiring apparatus;

a channel selection control unit which remote-controls a channel selecting process by the information acquiring apparatus based on the acquired program identification information;

a second scenario information acquiring unit which acquires the scenario information related to the program to be watched based on the acquired program identification information;

a second display unit which displays the scenario information related to the program to be watched; and a second display control unit which can control the second display unit such that the display state of the scenario information related to the program to be watched is changed depending on the display state of the scenario information in the information acquiring apparatus based on the predetermined setting information or the predetermined operation information, wherein when a display of the scenario information is stopped in the information acquiring apparatus, the second display control unit controls the second display unit to display the scenario information the display of which is stopped, wherein when the program to be watched is liked by each of a plurality of users based on preset user preferences associated with a respective display control unit, then the respective display control unit displays scenario information related to the program to be watched and matched with the respective user's, and wherein when the program to be watched is not liked by a particular one of the plurality of users based on the particular user's preferences associated with the particular user's display control unit, then the particular user's display control unit displays scenario information related to a different program from the program to be watched.

15. An information providing method applied to an information providing system in which an information providing apparatus which provides electronic content guide information related to a program, an information acquiring apparatus which acquires and displays video information and the electronic content guide information of the program, and a remote control terminal which can remote-control the information acquiring apparatus can communicate with each other, comprising the steps of: by the remote control terminal, acquiring program identification information to designate a program watched by using the information acquiring apparatus;

remote-controlling a channel selecting process by the information acquiring apparatus based on the acquired program identification information;

acquiring scenario information included in the electronic content guide information related a program to be watched from the information providing apparatus based on the acquired program identification information;

displaying the scenario information related to the program to be watched; and controlling a display of the scenario information to change a display state of the scenario information related to the program to be watched depending on a display state of the scenario information in the information acquiring apparatus based on predetermined setting information or predetermined operation information, wherein when a display of the scenario information is stopped in the information acquiring apparatus, the display control unit controls the display unit to display the scenario information the display of which is stopped, wherein when the program to be watched is liked by each of a plurality of users based on preset user preferences associated with a respective display control unit, then the respective display control unit displays scenario information related to the program to be watched and matched with the respective user's, and wherein when the program to be watched is not liked by a particular one of the plurality of users based on the particular user's preferences associated with the particular user's display control unit, then the particular user's display control unit displays scenario information related to a different program from the program to be watched.

16. A non-transitory computer-readable storage device having stored thereon a program to cause a computer to execute an information providing method applied to an information providing system in which an information providing apparatus which provides electronic content guide information related to a program, an information acquiring apparatus which acquires and displays video information and the electronic content guide information of the program, and a remote control terminal which can remote-control the information acquiring apparatus can communicate with each other, wherein the information providing method comprises the steps of: by the remote control terminal, acquiring program identification information to designate a program watched by using the information acquiring apparatus;

remote-controlling a channel selecting process by the information acquiring apparatus based on the acquired program identification information;

acquiring scenario information included in the electronic content guide information related a program to be watched from the information providing apparatus based on the acquired program identification information;

displaying the scenario information related to the program to be watched; and controlling a display of the scenario information to change a display state of the scenario information related to the program to be watched depending on a display state of the scenario information in the information acquiring apparatus based on predetermined setting information or predetermined operation information, wherein when a display of the scenario information is stopped in the information acquiring apparatus, the display control unit controls the display unit to display the scenario information the display of which is stopped, wherein when the program to be watched is liked by each of a plurality of users based on preset user preferences associated with a respective display control unit, then the respective display control unit displays scenario information related to the program to be watched and matched with the respective user's, and wherein when the program to be watched is not liked by a particular one of the plurality of users based on the particular user's preferences associated with the particular user's display control unit, then the particular user's display control unit displays scenario information related to a different program from the program to be watched.

* * * * *